(12) United States Patent
Sridharan et al.

(10) Patent No.: US 12,463,762 B2
(45) Date of Patent: Nov. 4, 2025

(54) TIME-DOMAIN WINDOWS FOR DEMODULATION REFERENCE SIGNAL BUNDLED TRANSMISSIONS

(71) Applicant: QUALCOMM Incorporated, San Diego, CA (US)

(72) Inventors: Gokul Sridharan, Sunnyvale, CA (US); Ahmed Abdelaziz Ibrahim Abdelaziz Zewail, San Diego, CA (US); Hung Dinh Ly, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 17/806,063

(22) Filed: Jun. 8, 2022

(65) Prior Publication Data

US 2022/0399971 A1 Dec. 15, 2022

Related U.S. Application Data

(60) Provisional application No. 63/202,435, filed on Jun. 10, 2021.

(51) Int. Cl.
*H04L 5/00* (2006.01)
*H04W 72/1268* (2023.01)
*H04W 72/23* (2023.01)

(52) U.S. Cl.
CPC ....... *H04L 5/0048* (2013.01); *H04W 72/1268* (2013.01); *H04W 72/23* (2023.01)

(58) Field of Classification Search
CPC .. H04L 5/0048; H04W 72/23; H04W 72/1268
See application file for complete search history.

(56) References Cited

U.S. PATENT DOCUMENTS

| | | | |
|---|---|---|---|
| 2011/0081939 A1* | 4/2011 | Damnjanovic | H04W 52/54 455/522 |
| 2022/0217713 A1* | 7/2022 | Lei | H04W 72/0453 |
| 2022/0248430 A1* | 8/2022 | Ly | H04L 1/1864 |
| 2022/0360394 A1* | 11/2022 | Ly | H04L 5/0053 |

(Continued)

OTHER PUBLICATIONS

Interdigital, Inc et al., "Joint Channel Estimation for PUSCH", 3GPP TSG RAN WG1 #105-e, R1-2104861, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011082, 9 Pages.

(Continued)

*Primary Examiner* — Duc C Ho
(74) *Attorney, Agent, or Firm* — Harrity & Harrity, LLP

(57) ABSTRACT

Various aspects of the present disclosure generally relate to wireless communication. In some aspects, a user equipment (UE) may receive scheduling information for a set of uplink transmissions of the UE. The UE may identify a set of time-domain windows for demodulation reference signal (DMRS) bundling. The UE may transmit the set of uplink transmissions using a DMRS bundling configuration that is based at least in part on the set of time-domain windows for DMRS bundling. Numerous other aspects are described.

30 Claims, 11 Drawing Sheets

(56) References Cited

U.S. PATENT DOCUMENTS

2024/0114490 A1* 4/2024 Bhamri ................ H04L 5/0012

OTHER PUBLICATIONS

International Search Report and Written Opinion—PCT/US2022/072843—ISA/EPO—Oct. 5, 2022.
Lenovo et al., "Enhancements for Joint Channel Estimation for Multiple PUSCH", 3GPP TSG RAN WG1 #105-e, R1-2105775, 3rd Generation Partnership Project, Mobile Competence Centre, 650, Route Des Lucioles, F-06921 Sophia-Antipolis Cedex, France, vol. RAN WG1, No. e-meeting, May 10, 2021-May 27, 2021, May 12, 2021, XP052011700, 6 Pages.
Moderator (China Telecom): "FL Summary of Joint Channel Estimation for PUSCH", 3GPP TSG RAN WG1 Meeting #104bis-e, R1-2103808, 3rd Generation Partnership Project, Mobile Competence Centre, 650, Route Des Lucioles, F-06921 Sophia-Antipolis Cedex, France, vol. RAN WG1, No. E-Meeting, Apr. 12, 2021-Apr. 20, 2021, Apr. 13, 2021, XP051995267, 30 Pages, p. 19-22, p. 7-8.
Qualcomm Incorporated: "Joint Channel Estimation for PUSCH", 3GPP TSG-RAN WG1 Meeting #105e, R1-2104687, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052010938, 9 Pages, the whole document.
Xiaomi: "Joint Channel Estimation For PUSCH", 3GPP TSG RAN WG1 #105-e, R1-2105577, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, XP052006408, 5 Pages.

* cited by examiner

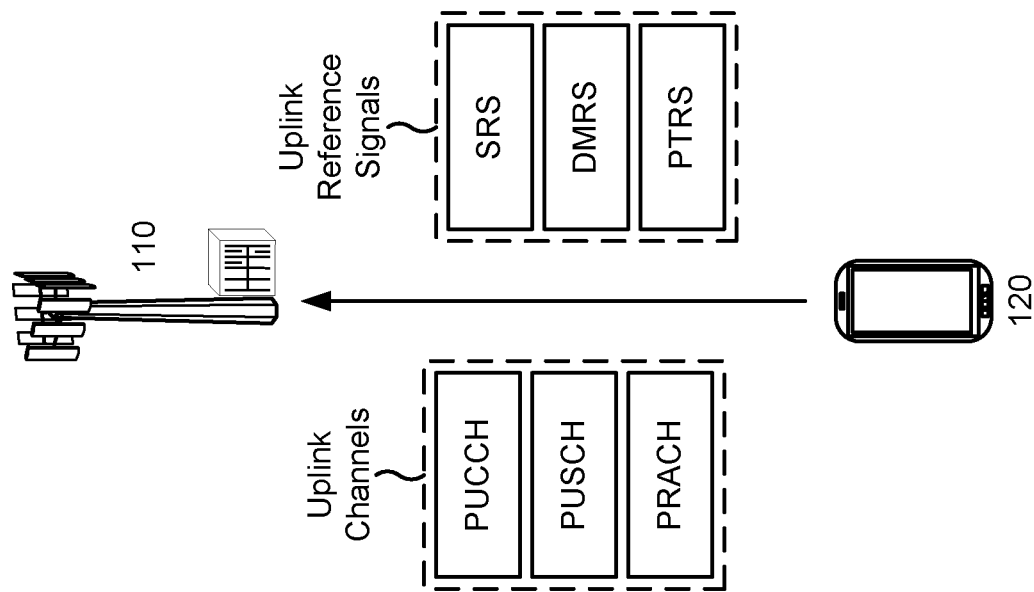
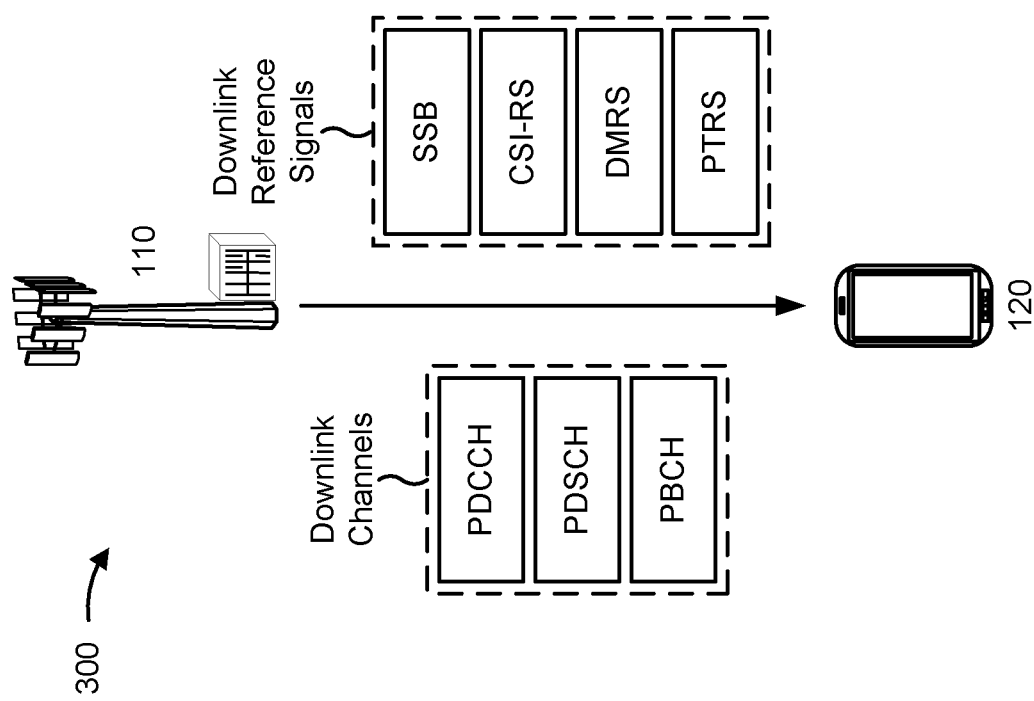
FIG. 3

TIME-DOMAIN WINDOWS FOR DEMODULATION REFERENCE SIGNAL BUNDLED TRANSMISSIONS

CROSS-REFERENCE TO RELATED APPLICATION

This patent application claims priority to U.S. Provisional Patent Application No. 63/202,435, filed on Jun. 10, 2021, entitled "TIME-DOMAIN WINDOWS FOR DEMODULATION REFERENCE SIGNAL BUNDLED TRANSMISSIONS," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for time-domain windows for demodulation reference signal (DMRS) bundled transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for wireless communication devices, such as a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving scheduling information for a set of uplink transmissions of the UE. The method may include identifying a set of time-domain windows for demodulation reference signal (DMRS) bundling. The method may include transmitting the set of uplink transmissions using a DMRS bundling configuration that is based at least in part on the set of time-domain windows for DMRS bundling.

Some aspects described herein relate to a method of wireless communication performed by a base station. The method may include transmitting scheduling information for a set of uplink transmissions of a UE. The method may include identifying a set of time-domain windows for DMRS bundling of the UE. The method may include receiving the set of uplink transmissions using a DMRS bundling configuration that is based at least in part on the set of time-domain windows for DMRS bundling.

Some aspects described herein relate to an apparatus for wireless communication. The apparatus may include means for receiving scheduling information for a set of uplink transmissions of the apparatus. The apparatus may include means for identifying a set of time-domain windows for DMRS bundling. The apparatus may include means for transmitting the set of uplink transmissions using a DMRS bundling configuration that is based at least in part on the set of time-domain windows for DMRS bundling.

Some aspects described herein relate to an apparatus for wireless communication. The apparatus may include means for transmitting scheduling information for a set of uplink transmissions of a UE. The apparatus may include means for identifying a set of time-domain windows for DMRS bundling of the UE. The apparatus may include means for receiving the set of uplink transmissions using a DMRS bundling configuration that is based at least in part on the set of time-domain windows for DMRS bundling.

Some aspects described herein relate to a UE for wireless communication. The user equipment may include memory, one or more processors coupled to the memory, and instructions stored in the memory and executable by the one or more processors. The instructions may be executable by the one or more processors to cause the user equipment to receive scheduling information for a set of uplink transmissions of the UE. The instructions may be executable by the one or more processors to cause the user equipment to identify a set of time-domain windows for DMRS bundling. The instructions may be executable by the one or more processors to cause the user equipment to transmit the set of uplink transmissions using a DMRS bundling configuration that is based at least in part on the set of time-domain windows for DMRS bundling.

Some aspects described herein relate to a base station for wireless communication. The base station may include memory, one or more processors coupled to the memory, and instructions stored in the memory and executable by the one or more processors. The instructions may be executable by the one or more processors to cause the base station to transmit scheduling information for a set of uplink transmissions of a UE. The instructions may be executable by the one or more processors to cause the base station to identify a set of time-domain windows for DMRS bundling of the UE. The instructions may be executable by the one or more processors to cause the base station to receive the set of uplink transmissions using a DMRS bundling configuration that is based at least in part on the set of time-domain windows for DMRS bundling.

Some aspects described herein relate to a non-transitory computer-readable medium that stores one or more instructions for wireless communication by a UE. The one or more instructions, when executed by one or more processors of the UE, may cause the UE to receive scheduling information for a set of uplink transmissions of the UE. The one or more instructions, when executed by one or more processors of the UE, may cause the UE to identify a set of time-domain windows for DMRS bundling. The one or more instructions, when executed by one or more processors of the UE, may cause the UE to transmit the set of uplink transmissions using a DMRS bundling configuration that is based at least in part on the set of time-domain windows for DMRS bundling.

Some aspects described herein relate to a non-transitory computer-readable medium that stores one or more instructions for wireless communication by a base station. The one or more instructions, when executed by one or more processors of the base station, may cause the base station to transmit scheduling information for a set of uplink transmissions of a UE. The one or more instructions, when executed by one or more processors of the base station, may cause the base station to identify a set of time-domain windows for DMRS bundling of the UE. The one or more instructions, when executed by one or more processors of the base station, may cause the base station to receive the set of uplink transmissions using a DMRS bundling configuration that is based at least in part on the set of time-domain windows for DMRS bundling.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
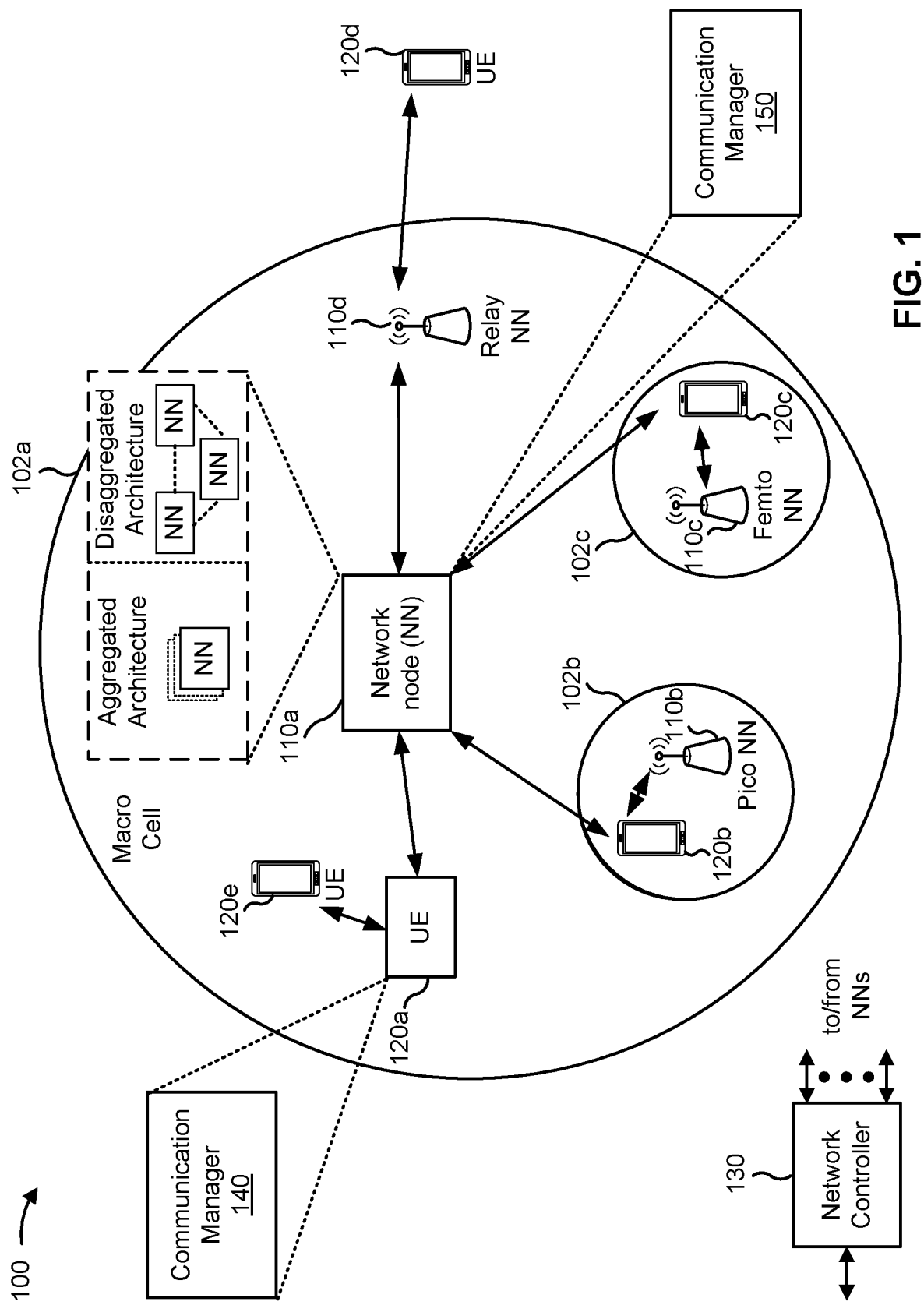
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a network entity 110a, a network entity 110b, a network entity 110c, and a network entity 110d), a user equipment (UE) 120 or multiple UEs 120 (shown as a UE 120a, a UE 120b, a UE 120c, a UE 120d, and a UE 120e), or other entities. A network entity 110 is an example of a network entity that communicates with UEs 120. As shown, a network entity 110 may include one or more network entities. For example, a network entity 110 may be an aggregated network entity, meaning that the aggregated network node is configured to utilize a radio protocol stack that is physically or logically integrated within a single RAN node (for example, within a single device or unit). As another example, a network entity 110 may be a disaggregated network node (sometimes referred to as a disaggregated base station), meaning that the network entity 110 includes two or more non-co-located network nodes. A disaggregated network entity may be configured to utilize a protocol stack that is physically or logically distributed among two or more nodes (such as one or more central units (CUs), one or more distributed units (DUs), or one or more radio units (RUs)).

In some examples, a network entity 110 includes an entity that communicates with UEs 120 via a radio access link, such as an RU. In some examples, a network entity 110 includes an entity that communicates with other network entities 110 via a fronthaul link or a midhaul link, such as a DU. In some examples, a network entity 110 includes an entity that communicates with other network entities 110 via a midhaul link or a core network via a backhaul link, such as a CU. In some examples, a network entity 110 (such as an aggregated network entity 110 or a disaggregated network entity 110) may include multiple network entities, such as one or more RUs, one or more CUs, or one or more DUs. A network entity 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network entities 110 may be interconnected to one another or to one or more other network entities 110 in the wireless network 100 through various types of fronthaul, midhaul, or backhaul interfaces, such as a direct physical connection, an air interface, or a virtual network, using any suitable transport network.

In some examples, a network entity 110 may provide communication coverage for a particular geographic area. In the Third Generation Partnership Project (3GPP), the term "cell" can refer to a coverage area of a network entity 110 or a network entity subsystem serving this coverage area, depending on the context in which the term is used.

A network entity 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network entity 110 for a macro cell may be referred to as a macro network entity. A network entity 110 for a pico cell may be referred to as a pico network entity. A network entity 110 for a femto cell may be referred to as a femto network entity or an in-home network entity. In the example shown in FIG. 1, the network entity 110a may be a macro network entity for a macro cell 102a, the network entity 110b may be a pico network entity for a pico cell 102b, and the network entity 110c may be a femto network entity for a femto cell 102c. A network entity may support one or multiple (for example, three) cells. In some examples, a cell may not necessarily be stationary, and the geographic area of the cell may move according to the location of a network entity 110 that is mobile (for example, a mobile network entity).

In some aspects, the term "base station" or "network entity" may refer to an aggregated base station, a disaggregated base station, an integrated access and backhaul (IAB) node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network entity" may refer to one device configured to perform one or more functions, such as those described herein in connection with the network entity 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (for example, a network entity 110 or a UE 120) and send a transmission of the data to a downstream station (for example, a UE 120 or a network entity 110). A relay station may be a UE 120 that can relay transmissions for other UEs 120. In the example shown in FIG. 1, the network entity 110d (for example, a relay network entity) may communicate with the network entity 110a (for example, a macro network entity) and the UE 120d in order to facilitate communication between the network entity 110a and the UE 120d. A network entity 110 that relays communications may be referred to as a relay station, a relay base station, a relay network entity, a relay node, or a relay, among other examples.

The wireless network 100 may be a heterogeneous network that includes network entities 110 of different types, such as macro network entities, pico network entities, femto network entities, or relay network entities. These different types of network entities 110 may have different transmit power levels, different coverage areas, or different impacts on interference in the wireless network 100. For example, macro network entities may have a high transmit power level (for example, 5 to 40 watts) whereas pico network entities, femto network entities, and relay network entities may have lower transmit power levels (for example, 0.1 to 2 watts).

A network controller 130 may couple to or communicate with a set of network entities 110 and may provide coordination and control for these network entities 110. The network controller 130 may communicate with the network entities 110 via a backhaul communication link or a midhaul communication link. The network entities 110 may communicate with one another directly or indirectly via a wireless or wireline backhaul communication link. In some aspects, the network controller 130 may be a CU, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network entity, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network entity 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive scheduling information for a set of uplink transmissions of the UE; identify a set of time-domain windows for demodulation reference signal (DMRS) bundling; and transmit the set of uplink transmissions using a DMRS bundling configuration that is based at least in part on the set of time-domain windows for DMRS bundling. Additionally, or alternatively, the communication manager 140 may perform one or more other operations described herein.

In some aspects, the network entity 110 may include a communication manager 150. As described in more detail elsewhere herein, the communication manager 150 may transmit scheduling information for a set of uplink transmissions of a UE; identify a set of time-domain windows for DMRS bundling of the UE; and receive the set of uplink transmissions using a DMRS bundling configuration that is based at least in part on the set of time-domain windows for DMRS bundling. Additionally, or alternatively, the communication manager 150 may perform one or more other operations described herein.

As indicated above, FIG. 1 is provided as an example. Other examples may differ from what is described with regard to FIG. 1.

Figure 2:
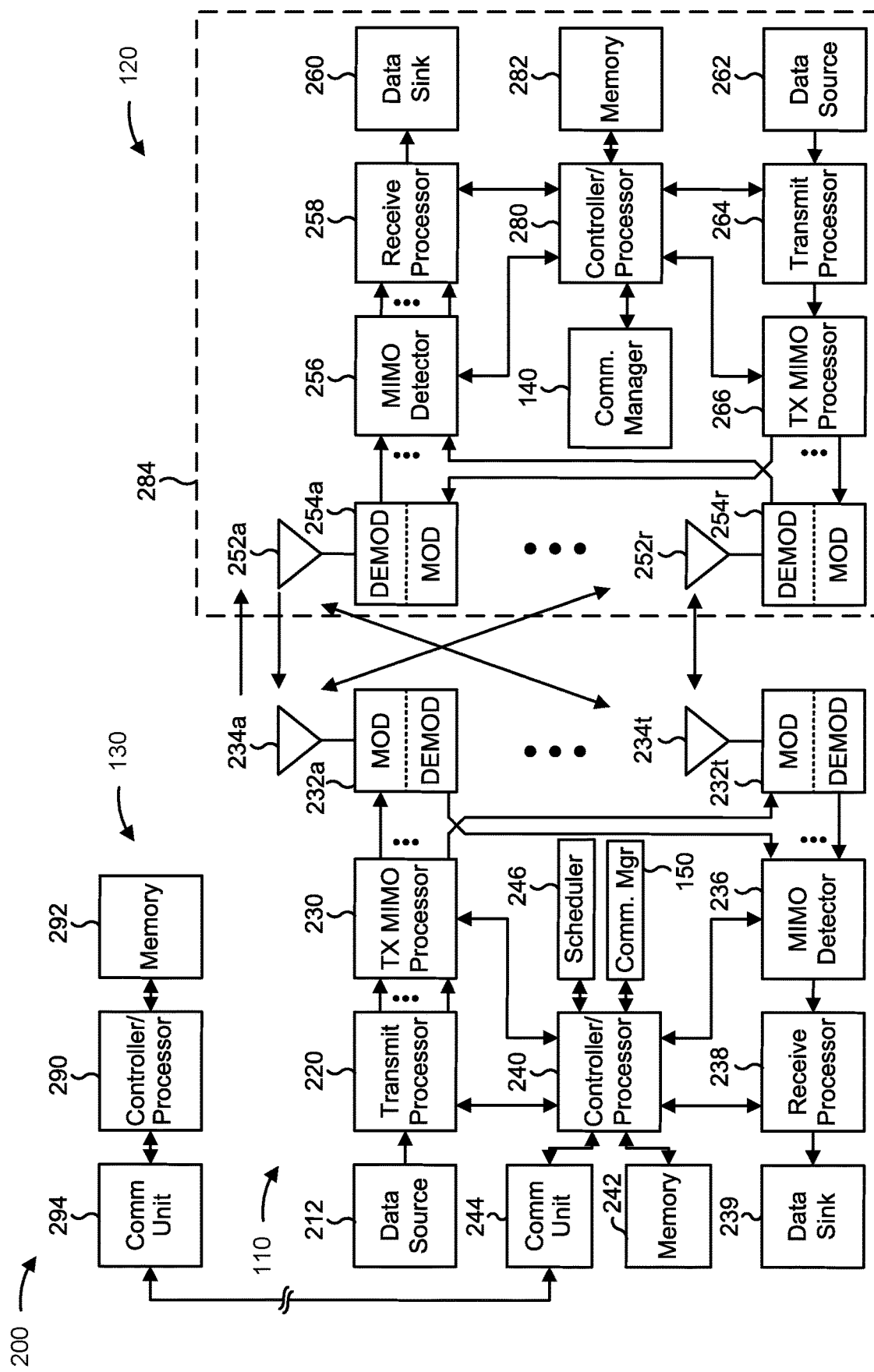
FIG. 2 is a diagram illustrating an example of a base station in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1). The network entity 110 of example 200 includes one or more radio frequency components, such as antennas 234 and a modem 254. In some examples, a network entity 110 may include an interface, a communication component, or another component that facilitates communication with the UE 120 or another network entity. Some network entities 110 may not include radio frequency components that facilitate direct communication with the UE 120, such as one or more CUs, or one or more DUs.

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-6).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-6).

The controller/processor 240 of the network entity 110, the controller/processor 280 of the UE 120, and/or any other component(s) of FIG. 2 may perform one or more techniques associated with time-domain windows for demodulation reference signal bundled transmissions, as described in more detail elsewhere herein. For example, the controller/processor 240 of the network entity 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving scheduling information for a set of uplink transmissions of the UE; means for identifying a set of time-domain windows for DMRS bundling; and/or means for transmitting the set of uplink transmissions using a DMRS bundling configuration that is based at least in part on the set of time-domain windows for DMRS bundling. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting scheduling information for a set of uplink transmissions of a UE; means for identifying a set of time-domain windows for DMRS bundling of the UE; and/or means for receiving the set of uplink transmissions using a DMRS bundling configuration that is based at least in part on the set of time-domain windows for DMRS bundling. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical channels and reference signals (sometimes abbreviated as "RSs") in a wireless network (e.g., wireless network 100), in accordance with the present disclosure. As shown in FIG. 3, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH. The PUSCH may carry end-user application data, signaling radio bearer (SRB) messages, medium access control (MAC) information (e.g., MAC control elements (CEs) (MAC-CEs) such as buffer status reporting and power headroom reporting), channel state information, or the like.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network entity 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 110 may configure a set of CSI-RSs for the UE 120, and the UE 120 may measure the configured set of CSI-RSs. Based at least in part on the measurements, the UE 120 may perform channel estimation and may report channel estimation parameters to the network entity 110 (e.g., in a CSI report), such as a CQI, a precoding matrix indicator (PMI), a CSI-RS resource indicator (CRI), a layer indicator (LI), a rank indicator (RI), or an RSRP, among other examples. The network entity 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The DMRS is used on the uplink, the downlink, and the sidelink. The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary.

A PUSCH may be transmitted with a DMRS. A DMRS and a PUSCH may be transmitted using the same precoding and the same antenna ports, such that the DMRS and the PUSCH experience the same composite propagation channel. The network entity 110 may have knowledge of the sequence transmitted by the DMRS so that the network entity 110 can deduce the composite propagation channel by comparing the received DMRS with the transmitted DMRS. "Precoding" includes the precoding which is applied for MIMO and beamforming. The DMRS may be transmitted within the set of resource blocks (RBs) allocated for a PUSCH.

In some aspects, multiple DMRSs (associated with multiple PUSCHs) may be bundled with each other. DMRSs bundled with each other, and the corresponding PUSCHs including bundled DMRSs, may be referred to as "DMRS bundled." Bundled DMRSs are transmitted in such a fashion as to provide phase continuity between bundled DMRSs. For example, the UE 120 may transmit the bundled DMRSs without switching from a transmit mode to a receive mode, without tuning away from and back to a transmit frequency of the DMRSs, or the like. By providing phase continuity between bundled DMRSs, a receiver (e.g., the network entity 110) can combine the bundled DMRSs to improve channel estimation. If phase continuity were not provided for bundled DMRSs, then it may be difficult or impossible to combine DMRSs across PUSCH transmissions, thereby reducing or eliminating the benefit of DMRS bundling.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

As described above, DMRS bundling provides improved channel estimation performance at the receiver, thereby improving decoding performance. A UE performing DMRS bundling may transmit multiple PUSCHs while maintaining a threshold level of phase continuity across the multiple PUSCHs (and therefore, across bundled DMRSs transmitted with the multiple PUSCHs). For example, DMRS bundling may aim to provide a continuous and linear phase ramp across all slots corresponding to the multiple PUSCHs.

In some cases, a UE may transmit multiple PUSCHs that carry different transport blocks (e.g., a first PUSCH may carry a first transport block or set of transport blocks, and a second PUSCH may carry a second transport block or set of transport blocks). In this case, typically, scheduling of the multiple PUSCHs may occur via multiple grants, such as via DCI transmissions. If the UE is to maintain phase continuity across a set of bundled DMRSs, then the UE may need to have information indicating, before transmission of the set of bundled DMRSs, that the DMRSs are to be bundled. For example, without information indicating a start of a DMRS bundled set of PUSCH transmissions and an end of the DMRS bundled set of PUSCH transmissions, it may be difficult for the UE to maintain a configuration that provides phase continuity. The usage of multiple grants to schedule DMRS bundled PUSCHs may lead to difficulty in maintaining phase continuity, particularly if a grant arrives after a start of a DMRS bundled group of uplink transmissions, or if a grant carries certain parameters that are detrimental to DMRS bundling (e.g., changes in transport block size, changes in power control parameters, or the like). Furthermore, even for single-DCI scheduling of multiple PUSCHs with different transport blocks, a single DCI can configure parameters that are incompatible with DMRS bundling, such as gaps that are too long to maintain phase continuity, changing power control leading to phase discontinuity, changing frequency domain resource allocations (FDRAs) leading to phase discontinuity, or the like. In such scenarios, the usage of DMRS bundling may be hampered or prevented, thereby leading to diminished uplink communication performance and decreased throughput.

Some techniques and apparatuses described herein provide configuration of DMRS bundling for uplink transmissions, such as multiple PUSCHs associated with different transport blocks (TBs). For example, some techniques and apparatuses described herein provide for an explicit (e.g., static) DMRS bundling configuration, in which time-domain windows (TDWs) for DMRS bundling are decoupled from PUSCH scheduling (e.g., are independent of PUSCH scheduling). As another example, some techniques and apparatuses described herein provide for DMRS bundling configuration based at least in part on grants associated with PUSCHs, such as based at least in part on signaling that conveys that a set of uplink transmissions are to be DMRS bundled. Furthermore, some techniques and apparatuses described herein provide DMRS bundling configuration for a multi-PUSCH grant, where multiple PUSCHs are granted by a single DCI. In this way, DMRS bundling is facilitated for multiple PUSCHs (such as those having different TBs), which improves uplink communication performance and increases throughput.

Figure 4:
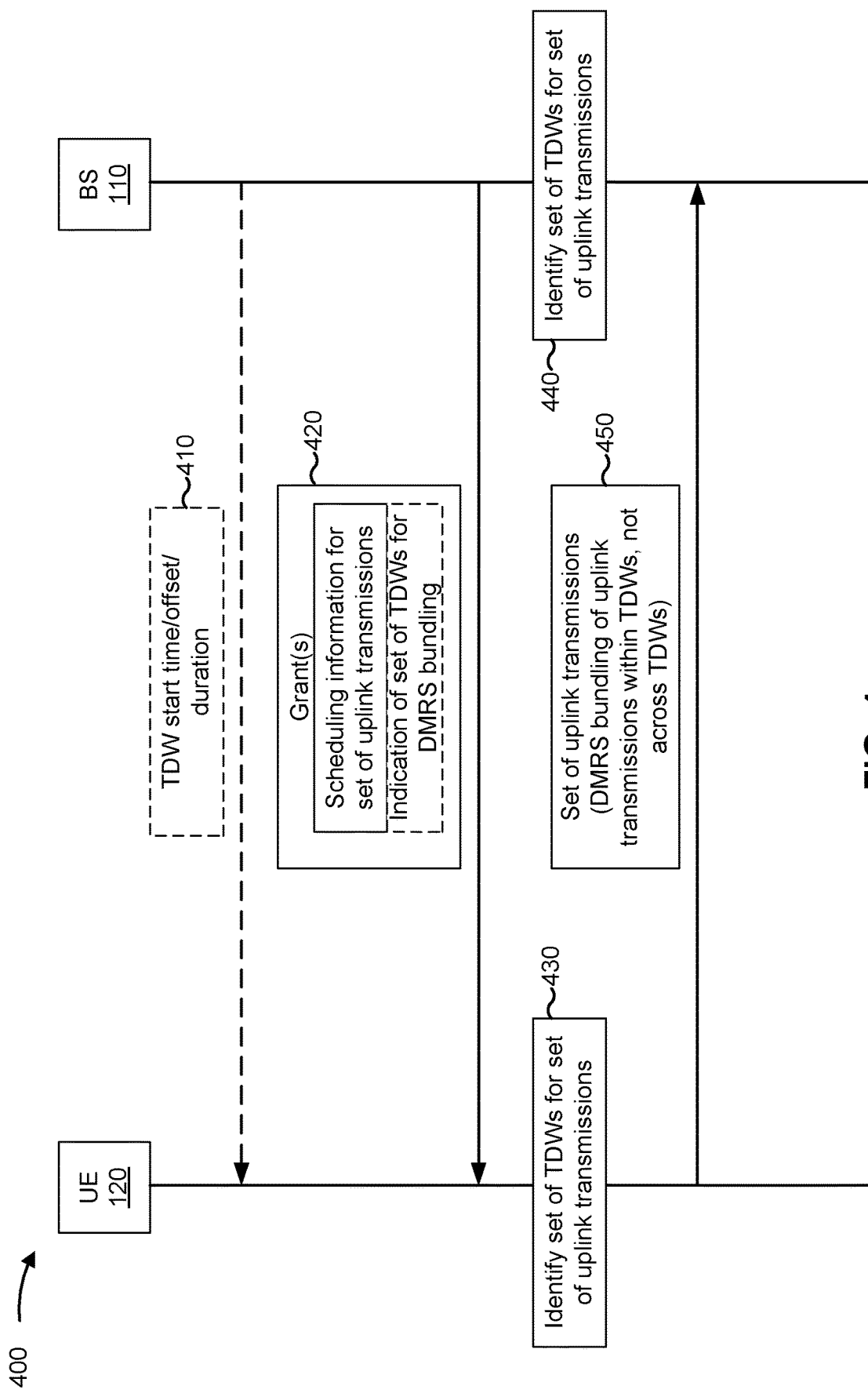
FIG. 4 is a diagram illustrating an example of signaling associated with demodulation reference signal (DMRS) bundling for a set of uplink transmissions, in accordance with the present disclosure.

FIG. 4 is a diagram illustrating an example 400 of signaling associated with DMRS bundling for a set of uplink transmissions, in accordance with the present disclosure. Example 400 includes a UE 120 and a network entity 110. The UE 120 and the network entity 110 may communication via a wireless network such as wireless network 100.

Figure 5:
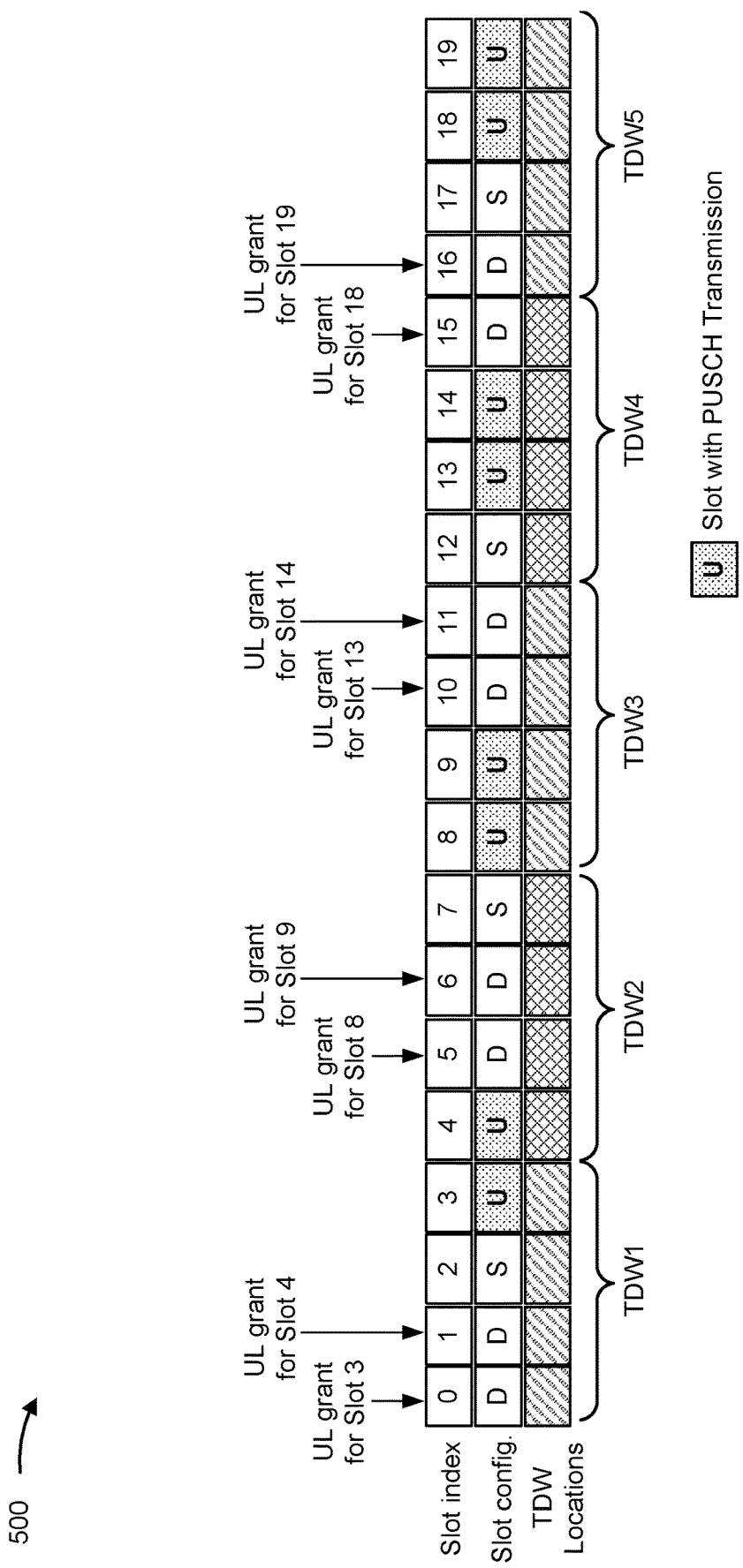
FIGS. 5 and 6 are diagrams illustrating examples of time-domain windows (TDWs) and signaling for DMRS bundling of a set of uplink transmissions, in accordance with the present disclosure.
Figure 6:
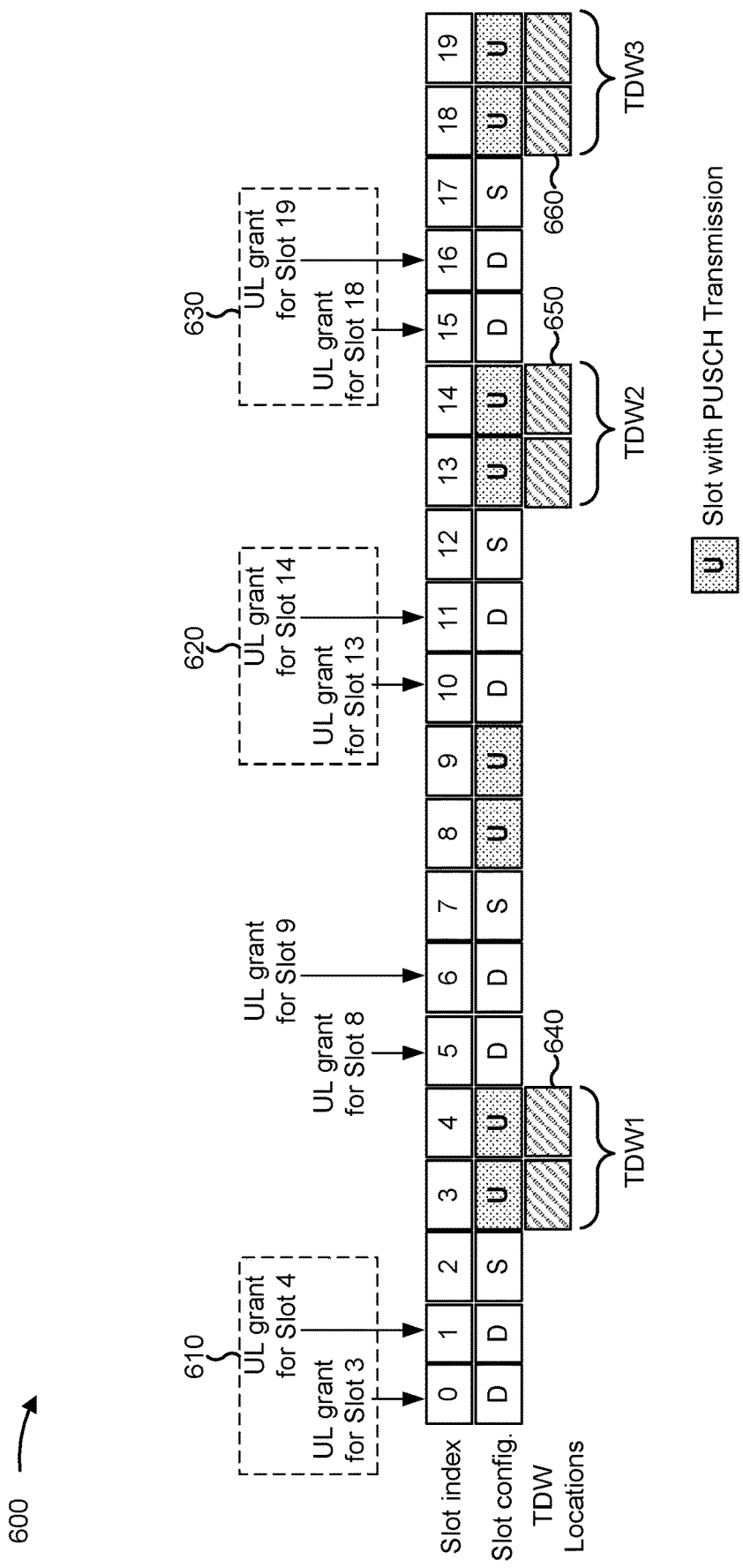

FIG. 4 relates to DMRS bundling for a set of uplink transmissions, such as a set of PUSCH transmissions. In some aspects, the set of PUSCH transmissions may carry different TBs. For example, each PUSCH transmission of the set of PUSCH transmissions may carry a different TB, such as scheduled via a different grant. In some other aspects, each PUSCH transmission of the set of PUSCH transmissions (that is, all PUSCH transmissions of the set of PUSCH transmissions) may be scheduled via a single DCI message. FIGS. 5 and 6 are diagrams illustrating examples 500 and 600 of TDW windows and signaling for DMRS bundling of a set of uplink transmissions, in accordance with the present disclosure.

As shown in FIG. 4, and by reference number 410, in some aspects, the BS 110 may provide information indicating a start time and/or an offset for a TDW. More generally, the BS 110 may provide configuration information indicating one or more parameters that define a TDW. A TDW, as described herein, is a window in which DMRS bundling is performed for uplink transmissions occurring within the TDW. For example, the UE 120 may use a DMRS bundling configuration such that phase continuity is maintained within the TDW, thus transmitting a set of bundled DMRSs for uplink transmissions within the TDW. The UE 120 may not perform DMRS bundling across a TDW boundary. For example, referring to FIG. 5, the UE 120 may not bundle DMRSs of the transmission in slot index 3 and the transmission in slot index 4, whereas the UE 120 may bundle DMRSs of the transmission in slot index 8 and the transmission in slot index 9. Thus, complexity of operation at the UE 120 is reduced by informing the UE 120 of time periods (e.g., TDWs) in which a DMRS bundling configuration is to (e.g., must) be maintained before the time period begins. As used herein "slot index n" can refer to a slot associated with slot index n.

In some aspects, a TDW may be independent of one or more times associated with a set of uplink transmissions (which may be referred to herein as "slot bundling"). Example 500 of FIG. 5 is an example where a set of TDWs (illustrated as TDW1, TDW2, TDW3, TDW4, and TDW5) are independent of times associated with uplink grants. In example 500, uplink grants are provided (e.g., by the network entity 110 for the UE 120) for uplink transmissions on each slot configured as an uplink (U) slot. It can be seen that the TDWs of example 500 are not necessarily aligned with the slots that include uplink transmissions. Thus, TDW locations and durations may be decoupled from PUSCH scheduling (such as via a configured grant with or without repetitions or a dynamic grant with or without repetitions). In this way, complexity of operation at the UE 120 is reduced by informing the UE 120 of time periods (e.g., TDWs) in which a DMRS bundling configuration is to (e.g., must) be maintained before the time period begins, since the UE 120 can operate such that the UE 120 expects to bundle across each slot of a TDW irrespective of PUSCH scheduling decisions of the BS 110. This may be beneficial because the UE 120 may not have prior knowledge of whether additional grants are to arrive, and knowing TDW boundaries in advance of grant arrival allows the UE 120 to plan around TDW boundaries, for example, by scheduling frequency offset correction at TDW boundaries rather than during a TDW. Furthermore, scheduling flexibility of the network entity 110 may be improved, since the process of DMRS bundling can be decoupled from the process of PUSCH scheduling, and the network entity 110 need not provide all of a set of grants to the UE 120 prior to requesting DMRS bundling of uplink transmissions scheduled by the set of grants. Still further, independent TDWs can be used for DMRS bundling for PUSCHs or for PUCCHs.

In some aspects, the information shown by reference number 410 of FIG. 4 may indicate a start time for a TDW. In example 500, the start time may correspond to slot index 0. In some aspects, the information shown by reference number 410 may indicate an offset for a TDW. The offset may indicate a start time of a next TDW. For example, in example 500, the offset may be "4," indicating that a TDW starts each four slots. In some aspects, TDWs may not be contiguous with each other. For example, there may be one or more slots (e.g., between two TDWs) that are not included in a TDW. As another example, a bundling duration of a TDW may be shorter than a number of slots between the start of each TDW. In some aspects, the offset may be based at least in part on a capability of the UE 120, which may be communicated via capability information transmitted by the UE 120. For example, a UE 120 capable of maintaining DMRS bundling over a longer period of time may use a larger offset, whereas a UE 120 that is not capable of maintaining DMRS bundling over a long period of time may use a shorter offset. A duration of the TDW (sometimes referred to herein as a bundling duration) may identify a length of a TDW. The UE 120 may receive, be configured with, or determine an offset indicating a start time for a time-domain window of the set of time-domain windows and a duration identifying a length of the time-domain window.

In some aspects, a bundling duration of a TDW may be based at least in part on one or more parameters of the set of uplink transmissions. For example, the one or more parameters may include, for example, modulation orders of the set of uplink transmissions. However, in some aspects, the UE 120 may not know, prior to receiving the one or more grants, the modulation orders of the set of uplink transmissions. In some aspects, the UE 120 may assume a worst-case modulation order (e.g., a most complex modulation order, such as 256 quadrature amplitude modulation (256-QAM)) and may select a bundling duration according to the assumption of the worst-case modulation order. The worst-case modulation order may be referred to as an expected worst-case modulation order. This may result in relatively short TDWs (relative to TDWs determined based at least in part on other modulation orders). In some other aspects, the UE 120 may restrict DMRS bundling to only PUSCH grants that have a threshold modulation order. In some aspects, DMRS bundling may be restricted to PUSCH grants that use a particular modulation order, such as a QPSK modulation order. In such aspects, the UE 120 and the network entity 110 may determine the bundling duration according to the QPSK modulation order. If a grant is received for an uplink transmission that violates the threshold modulation order, then the uplink transmission may be assumed to not be bundled with a remainder of uplink transmissions in a TDW.

As shown by reference number 420, the UE 120 may receive one or more grants from the BS 110. The one or more grants may provide (e.g., convey) scheduling information for a set of uplink transmissions, such as a set of PUSCHs. In some aspects, two or more of the set of PUSCHs may carry different TBs. The UE 120 may receive the one or more grants via one or more DCI messages, which may be transmitted via one or more PDCCHs. In some aspects, the UE 120 may receive scheduling information for multiple uplink transmissions via a single DCI message, such as a multi-PUSCH DCI message. The scheduling information may indicate resources for the multiple uplink transmissions, parameters for transmission of the multiple uplink transmissions, or the like.

In some aspects, the scheduling information may be for a set of uplink transmissions, where TDWs are independent of the set of uplink transmissions (as described, for example, in connection with FIG. 5). In this case, in some aspects, there may be a restriction of scheduling for DMRS bundling. For example, all grants that fall within a TDW may be mandated to arrive prior to a start of the TDW to be considered for DMRS bundling. For example, the UE 120 may transmit a set of uplink transmissions within a TDW using DMRS bundling if a set of grants, for each uplink transmission of the set of uplink transmissions, arrives before the start of the TDW. If a grant arrives after a start of the TDW, then the UE 120 may not be expected to bundle (e.g., may not bundle) the corresponding uplink transmission as part of the TDW.

In some aspects, the scheduling information may include or be associated with information indicating a TDW. For example, the scheduling information may include or be associated with information indicating a set of uplink transmissions that are to be DMRS bundled. In this case, additional signaling associated with or included in the scheduling information may indicate that uplink transmissions scheduled by the scheduling information are to be bundled. An example is shown in FIG. 6, where scheduling information indicates that a group of grants shown by reference number 610 schedule uplink transmissions that are to be DMRS bundled, a group of grants shown by reference number 620 schedule uplink transmissions that are to be DMRS bundled, and a group of grants shown by reference number 630 schedule uplink transmissions that are to be DMRS bundled. TDWs shown by reference numbers 640, 650, and 660 are identified based at least in part on the scheduling information.

In some aspects, an indication that a set of uplink transmissions are to be DMRS bundled may be provided as part of a first grant of the set of uplink transmissions. In some aspects, an indication that a set of uplink transmissions are to be DMRS bundled may be provided as part of a last grant of the set of uplink transmissions. In some aspects, the indication may indicate how many uplink transmissions are to be bundled, which may impact how power updates and similar operations are handled. Signaling the indication as part of a first grant of the set of uplink transmissions may be beneficial for the UE 120, since the UE 120 is provided with additional time to prepare for DMRS bundling. Signaling the indication as part of a last grant of the set of uplink transmissions may be beneficial for the BS 110 because the BS 110 can enable bundling after decisions on all grants are made. In example 600, the placement of a first TDW (shown by reference number 640) may begin with the first uplink transmission to be bundled, and each TDW may last as long as the uplink transmissions that are to be bundled. For example, a TDW may end after the last uplink transmission that is to be bundled of a group of uplink transmissions. Thus, the TDW locations and durations may be coupled to PUSCH scheduling. Since the UE 120 has knowledge of all grants received by the UE 120, the UE 120 can determine how to place the TDWs. Thus, there is no need for the UE 120 to anticipate DMRS bundling before grants have arrived (e.g., DMRS bundling in this case may be causal in nature). Furthermore, this approach may allow for the network entity 110 to optimally determine TDW locations to maximize bundling opportunities.

As shown by reference numbers 430 and 440, the UE 120 and the network entity 110 may identify a set of TDWs for the set of uplink transmissions. In some aspects, as described in connection with FIG. 5, the set of TDWs may be independent of the one or more grants and the set of uplink transmissions. In such a case, the UE 120 and the network entity 110 may identify the set of TDWs based at least in part on information identifying a start time, a bundling duration, and/or an offset for the set of TDWs. In some other aspects, the set of TDWs may be coupled to scheduling of the set of uplink transmissions, as described in connection with FIG. 6. In such a case, the UE 120 and the network entity 110 may identify the set of TDWs based at least in part on the one or more grants and/or the set of uplink transmissions scheduled by the one or more grants.

As shown by reference number 450, the UE 120 may transmit, and the network entity 110 may receive, the set of uplink transmissions. As further shown, the UE 120 and the network entity 110 may perform DMRS bundling of uplink transmissions within TDWs (determined in connection with reference numbers 430 and 440), and not across TDW boundaries. For example, the UE 120 may maintain phase continuity within each TDW. The network entity 110 may combine DMRSs within each TDW and may perform channel estimation using the combined DMRSs.

In some aspects, the UE 120 may receive a transmit power control (TPC) command during a TDW. In some aspects, the UE 120 may postpone application of the TPC command until an end of the TDW, which avoids loss of phase continuity due to the TPC command. In some aspects, the UE 120 may ignore (e.g., disregard) the TPC command based at least in part on the TPC command being received during a TDW. In some aspects, a TPC command may be mandated to indicate a zero-power transmit power adjustment based at least in part on the TPC command being within a TDW. For example, during a TDW, the network entity 110 may transmit only TPC commands indicating a 0 dB transmit power adjustment.

In some aspects, the one or more grants may indicate that a first uplink transmission is to be transmitted with a different transmit power than a second uplink transmission (such as due to a change in spectral efficiency or the like). In this case, in some aspects, the UE 120 may break DMRS bundling. For example, the UE 120 may not DMRS bundle the first uplink transmission and the second uplink transmission based at least in part on the first uplink transmission and the second uplink transmission having different transmit powers (even if the first uplink transmission and the second uplink transmission are included in a TDW). In some other aspects, the UE 120 may override the difference in the transmit power, and the UE 120 may transmit the first uplink transmission and the second uplink transmission using DMRS bundling and using a same transmit power. Thus, the UE 120 may preserve DMRS bundling. In some other aspects, the UE 120 may treat a change in transport block size or spectral efficiency between two uplink transmissions in a TDW as an error case.

In some aspects, when TDWs are independent of scheduled uplink transmissions, the UE 120 may suspend a power saving configuration during a TDW. For example, a UE 120's ability to enter a power saving state (such as a low-power mode or an idle mode) may be precluded if the UE 120 is to anticipate bundling opportunities within a TDW while full scheduling information regarding the TDW is not available. For example, the UE 120 may keep a transmit chain active to ensure DMRS bundling can be performed without phase discontinuity. Thus, the UE 120 may suspend one or more power saving configurations during a TDW.

In some aspects, the network entity 110 may transmit, and the UE 120 may receive, signaling that activates or deactivates DMRS bundling. For example, the signaling may be MAC-CE signaling or DCI-based signaling. Thus, impact to power saving procedures may be mitigated by preserving power saving opportunities.

In some aspects, the UE 120 and the network entity 110 may deactivate inter-slot frequency hopping, which enables phase continuity across bundled DMRSs. Additionally, or alternatively, an FDRA for a group of uplink transmissions to be DMRS bundled may be constant across the group of uplink transmissions. For example, each uplink transmission of a TDW may have the same FDRA, which enables phase continuity across bundled DMRSs.

In some aspects, the UE 120 may receive the one or more grants via multi-PUSCH scheduling. Multi-PUSCH scheduling may provide for a plurality of PUSCHs (such as associated with different TBs) to be scheduled by a single DCI. Each TB may be mapped to at most one slot or one mini-slot. A gap can be scheduled between two PUSCHs. Once the UE 120 has received a multi-PUSCH scheduling grant, the UE 120 may have information indicating each uplink transmission of a set of uplink transmissions. Thus, the UE 120 can identify TDWs corresponding to one or more groups of uplink transmissions of the set of uplink transmissions. In some aspects, a gap between a first group of uplink transmissions and a second set of uplink transmissions, of the set of uplink transmissions, may be less than a configured threshold. For example, the gap may be enforced to be less than a preconfigured threshold. Additionally, or alternatively, power updates may be disallowed (e.g., disregarded, ignored) between transmissions of the set of uplink transmissions. Additionally, or alternatively, each uplink transmission of the set of uplink transmissions may use the same FDRA, as described in more detail elsewhere herein.

As indicated above, FIGS. 4-6 are provided as examples. Other examples may differ from what is described with regard to FIGS. 4-6.

Figure 7:
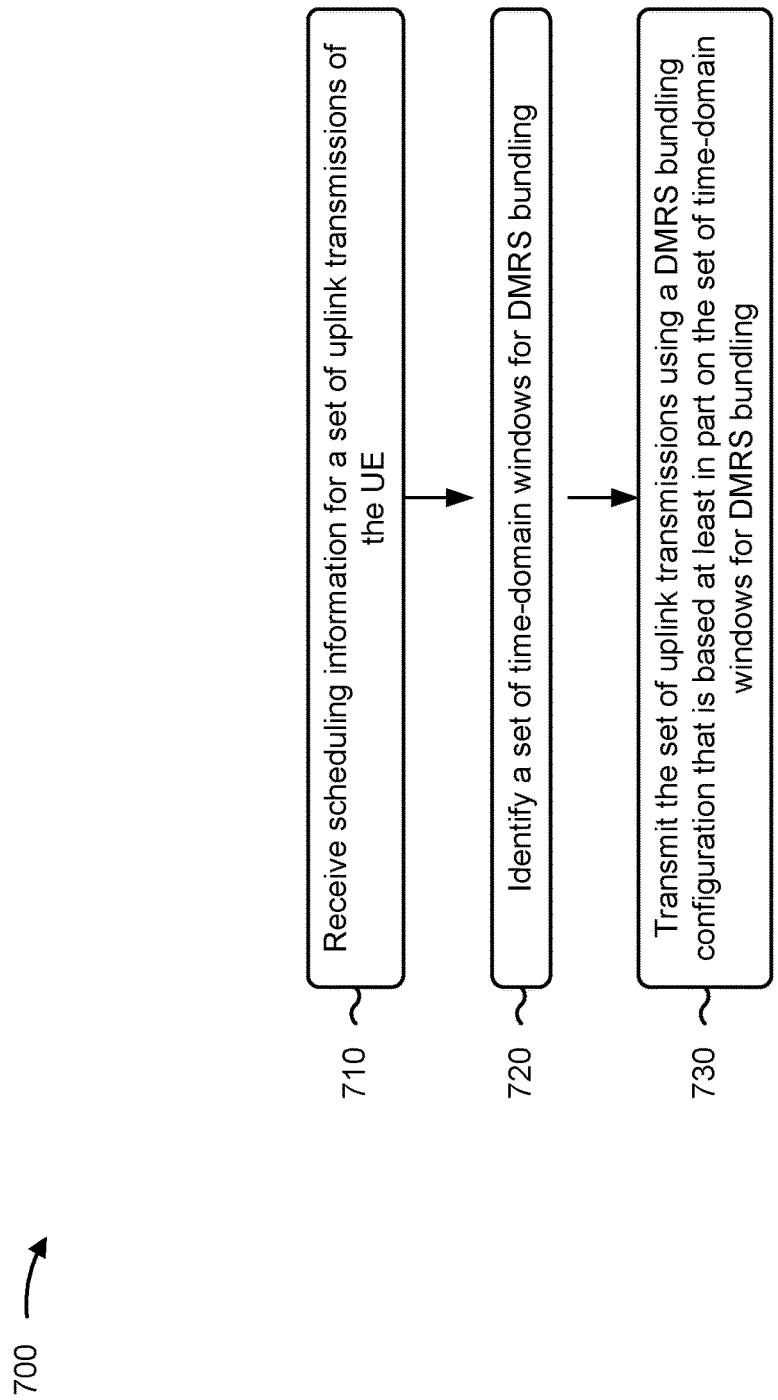
FIGS. 7-8 are diagrams illustrating example processes associated with DMRS bundling for a set of uplink transmissions, in accordance with the present disclosure.

FIG. 7 is a diagram illustrating an example process 700 performed, for example, by a UE, in accordance with the present disclosure. Example process 700 is an example where the UE (e.g., UE 120) performs operations associated with time-domain windows for demodulation reference signal bundled transmissions.

As shown in FIG. 7, in some aspects, process 700 may include receiving scheduling information for a set of uplink transmissions of the UE (block 710). For example, the UE (e.g., using communication manager 140 and/or reception component 902, depicted in FIG. 9) may receive scheduling information for a set of uplink transmissions of the UE, as described above.

As further shown in FIG. 7, in some aspects, process 700 may include identifying a set of time-domain windows for DMRS bundling (block 720). For example, the UE (e.g., using communication manager 140 and/or identification component 908, depicted in FIG. 9) may identify a set of time-domain windows for DMRS bundling, as described above.

As further shown in FIG. 7, in some aspects, process 700 may include transmitting the set of uplink transmissions using a DMRS bundling configuration that is based at least in part on the set of time-domain windows for DMRS bundling (block 730). For example, the UE (e.g., using communication manager 140 and/or transmission component 904, depicted in FIG. 9) may transmit the set of uplink transmissions using a DMRS bundling configuration that is based at least in part on the set of time-domain windows for DMRS bundling, as described above.

Process 700 may include additional aspects, such as any single aspect or any combination of aspects described below and/or in connection with one or more other processes described elsewhere herein.

In a first aspect, the set of time-domain windows are independent of one or more times associated with the set of uplink transmissions.

In a second aspect, alone or in combination with the first aspect, identifying the set of time-domain windows further comprises identifying the set of time-domain windows based at least in part on an offset indicating a start time for a time-domain window of the set of time-domain windows and a duration identifying a length of the time-domain window In a third aspect, alone or in combination with one or more of the first and second aspects, process 700 includes receiving information identifying at least one of the offset or the duration.

In a fourth aspect, alone or in combination with one or more of the first through third aspects, transmitting the set of uplink transmissions using the DMRS bundling configuration further comprises transmitting, with each uplink transmission that is within a particular time-domain window of the set of time-domain windows, one or more bundled DMRSs.

In a fifth aspect, alone or in combination with one or more of the first through fourth aspects, the bundled DMRSs are associated with a threshold level of phase continuity across each uplink transmission within the particular time-domain window.

In a sixth aspect, alone or in combination with one or more of the first through fifth aspects, transmitting each uplink transmission that is within the particular time-domain window, of the set of time-domain windows, including bundled DMRSs, is based at least in part on a set of grants, for each uplink transmission that is within the particular time-domain window, arriving before a start of the particular time-domain window.

In a seventh aspect, alone or in combination with one or more of the first through sixth aspects, a length of a time-domain window of the set of time-domain windows is based at least in part on a modulation order of the set of uplink transmissions.

In an eighth aspect, alone or in combination with one or more of the first through seventh aspects, the modulation order is an expected worst-case modulation order.

In a ninth aspect, alone or in combination with one or more of the first through eighth aspects, the DMRS bundling configuration is used only if the modulation order is one of a set of modulation orders.

In a tenth aspect, alone or in combination with one or more of the first through ninth aspects, the set of modulation orders includes a quadrature phase shift keying modulation order.

In an eleventh aspect, alone or in combination with one or more of the first through tenth aspects, process 700 includes receiving a TPC command during a time-domain window of the set of time-domain windows, and one of postponing application of the TPC command until an end of the time-domain window, or disregarding the TPC command.

In a twelfth aspect, alone or in combination with one or more of the first through eleventh aspects, process 700 includes receiving a TPC command during a time-domain window of the set of time-domain windows, wherein the TPC command indicates a zero-value transmit power adjustment based at least in part on the TPC command being within the time-domain window.

In a thirteenth aspect, alone or in combination with one or more of the first through twelfth aspects, transmitting the set of uplink transmissions using the DMRS bundling configuration that is based at least in part on the set of time-domain windows for DMRS bundling further comprises transmitting a first uplink transmission of the set of uplink transmissions using a first transmit power, and transmitting a second uplink transmission of the set of uplink transmissions using a second transmit power, wherein the first uplink transmission and the second uplink transmission are within a same time-domain window, and wherein the first uplink transmission and the second uplink transmission do not use DMRS bundling, based at least in part on the first uplink transmission and the second uplink transmission having different transmit powers.

In a fourteenth aspect, alone or in combination with one or more of the first through thirteenth aspects, transmitting the set of uplink transmissions using the DMRS bundling configuration that is based at least in part on the set of time-domain windows for DMRS bundling further comprises transmitting a first uplink transmission of the set of uplink transmissions using a first transmit power, and transmitting a second uplink transmission of the set of uplink transmissions using the first transmit power, wherein scheduling information for the second uplink transmission indicates a different transmit power than the first transmit power, and wherein the scheduling information for the second uplink transmission is overridden based at least in part on the first uplink transmission and the second uplink transmission being within a same time-domain window.

In a fifteenth aspect, alone or in combination with one or more of the first through fourteenth aspects, process 700 includes suspending a power saving configuration of the UE while the DMRS bundling configuration is active.

In a sixteenth aspect, alone or in combination with one or more of the first through fifteenth aspects, process 700 includes activating or deactivating the DMRS bundling configuration based at least in part on receiving medium access control signaling or downlink control information.

In a seventeenth aspect, alone or in combination with one or more of the first through sixteenth aspects, process 700 includes suspending inter-slot frequency hopping while the DMRS bundling configuration is active.

In an eighteenth aspect, alone or in combination with one or more of the first through seventeenth aspects, each uplink transmission of a group of uplink transmissions included in a time-domain window for DMRS bundling is associated with a same frequency domain resource allocation.

In a nineteenth aspect, alone or in combination with one or more of the first through eighteenth aspects, the scheduling information, or information associated with the scheduling information, indicates the set of time-domain windows.

In a twentieth aspect, alone or in combination with one or more of the first through nineteenth aspects, the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

In a twenty-first aspect, alone or in combination with one or more of the first through twentieth aspects, the scheduling information, or information associated with the scheduling information, indicates which uplink transmissions, of the set of uplink transmissions, are DMRS bundled with each other.

In a twenty-second aspect, alone or in combination with one or more of the first through twenty-first aspects, the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

In a twenty-third aspect, alone or in combination with one or more of the first through twenty-second aspects, the scheduling information is received via a single DCI and the set of uplink transmissions include a set of physical uplink shared channel transmissions.

In a twenty-fourth aspect, alone or in combination with one or more of the first through twenty-third aspects, a gap between a first group of transmissions and a second group of transmissions, of the set of uplink transmissions, is less than a configured threshold.

In a twenty-fifth aspect, alone or in combination with one or more of the first through twenty-fourth aspects, power updates are not allowed between uplink transmissions of the set of uplink transmissions.

In a twenty-sixth aspect, alone or in combination with one or more of the first through twenty-fifth aspects, each uplink transmission, of the set of uplink transmissions, is associated with the same frequency domain resource allocation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
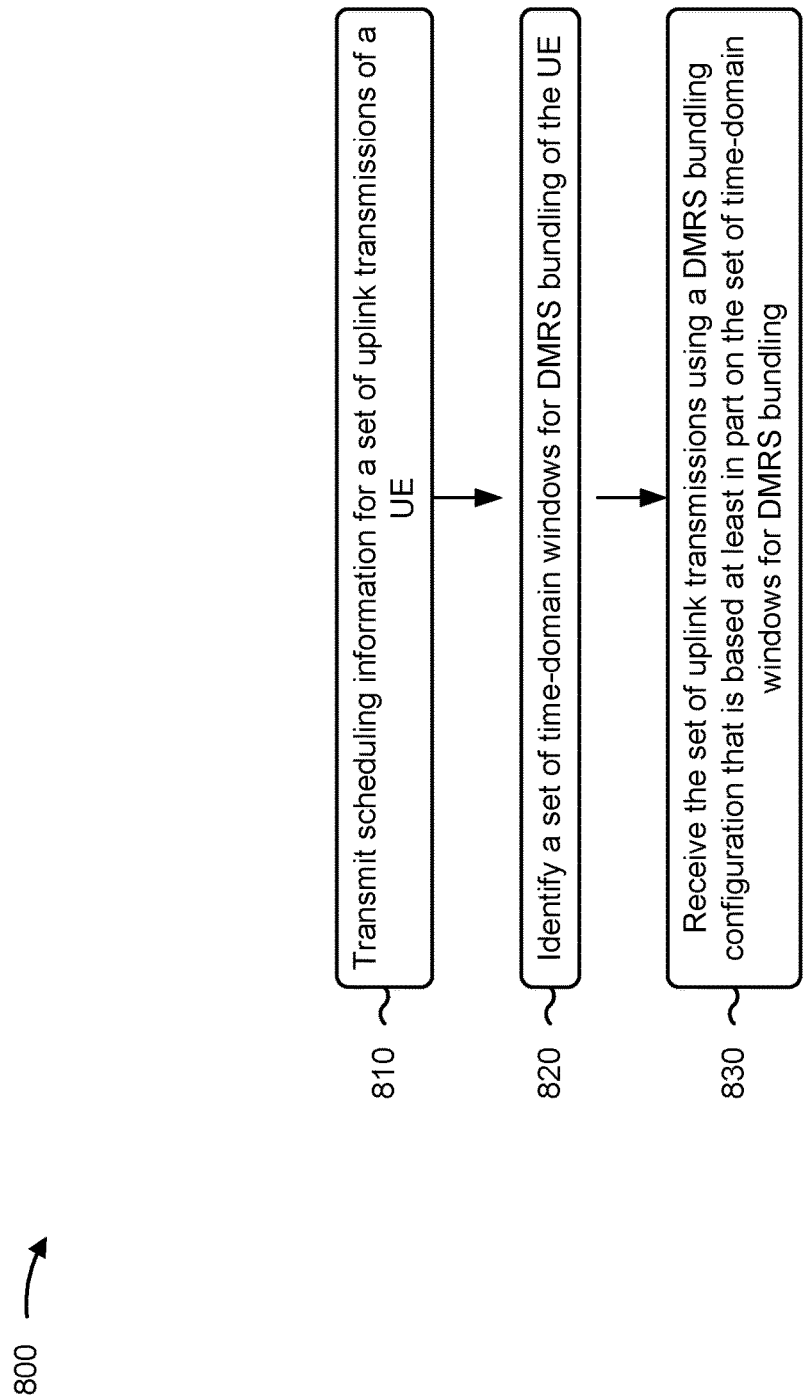

FIG. 8 is a diagram illustrating an example process 800 performed, for example, by a network entity, in accordance with the present disclosure. Example process 800 is an example where the network entity (e.g., network entity 110) performs operations associated with time-domain windows for demodulation reference signal bundled transmissions.

As shown in FIG. 8, in some aspects, process 800 may include transmitting scheduling information for a set of uplink transmissions of a UE (block 810). For example, the network entity (e.g., using communication manager 150 and/or transmission component 1004, depicted in FIG. 10) may transmit scheduling information for a set of uplink transmissions of a UE, as described above.

As further shown in FIG. 8, in some aspects, process 800 may include identifying a set of time-domain windows for DMRS bundling of the UE (block 820). For example, the network entity (e.g., using communication manager 150 and/or identification component 1008, depicted in FIG. 10) may identify a set of time-domain windows for DMRS bundling of the UE, as described above.

As further shown in FIG. 8, in some aspects, process 800 may include receiving the set of uplink transmissions using a DMRS bundling configuration that is based at least in part on the set of time-domain windows for DMRS bundling (block 830). For example, the network entity (e.g., using communication manager 150 and/or reception component 1002, depicted in FIG. 10) may receive the set of uplink transmissions using a DMRS bundling configuration that is based at least in part on the set of time-domain windows for DMRS bundling, as described above.

Process 800 may include additional aspects, such as any single aspect or any combination of aspects described below and/or in connection with one or more other processes described elsewhere herein.

In a first aspect, the set of time-domain windows are independent of one or more times associated with the set of uplink transmissions.

In a second aspect, alone or in combination with the first aspect, identifying the set of time-domain windows further comprises identifying the set of time-domain windows based at least in part on an offset indicating a start time for a time-domain window of the set of time-domain windows and a duration identifying a length of the time-domain window.

In a third aspect, alone or in combination with one or more of the first and second aspects, process 800 includes transmitting information identifying at least one of the offset or the duration.

In a fourth aspect, alone or in combination with one or more of the first through third aspects, receiving the set of uplink transmissions using the DMRS bundling configuration further comprises receiving, with each uplink transmission that is within a particular time-domain window of the set of time-domain windows, one or more bundled DMRSs.

In a fifth aspect, alone or in combination with one or more of the first through fourth aspects, the bundled DMRSs are associated with a threshold level of phase continuity across each uplink transmission within the time-domain window.

In a sixth aspect, alone or in combination with one or more of the first through fifth aspects, receiving each uplink transmission that is within the particular time-domain window, of the set of time-domain windows, including bundled DMRSs, is based at least in part on a set of grants, for each uplink transmission that is within the particular time-domain window, arriving before a start of the particular time-domain window.

In a seventh aspect, alone or in combination with one or more of the first through sixth aspects, a length of a time-domain window of the set of time-domain windows is based at least in part on a modulation order of the set of uplink transmissions.

In an eighth aspect, alone or in combination with one or more of the first through seventh aspects, the modulation order is an expected worst-case modulation order.

In a ninth aspect, alone or in combination with one or more of the first through eighth aspects, the DMRS bundling configuration is used only if the modulation order is one of a set of modulation orders.

In a tenth aspect, alone or in combination with one or more of the first through ninth aspects, the set of modulation orders includes a quadrature phase shift keying modulation order.

In an eleventh aspect, alone or in combination with one or more of the first through tenth aspects, process 800 includes transmitting a TPC command during a time-domain window of the set of time-domain windows, wherein the TPC command indicates a zero-value transmit power adjustment based at least in part on the TPC command being within the time-domain window.

In a twelfth aspect, alone or in combination with one or more of the first through eleventh aspects, process 800 includes suspending a power saving configuration of the UE while the DMRS bundling configuration is active.

In a thirteenth aspect, alone or in combination with one or more of the first through twelfth aspects, process 800 includes transmitting medium access control signaling or downlink control information indicating to activate or deactivate the DMRS bundling configuration.

In a fourteenth aspect, alone or in combination with one or more of the first through thirteenth aspects, process 800 includes suspending inter-slot frequency hopping while the DMRS bundling configuration is active.

In a fifteenth aspect, alone or in combination with one or more of the first through fourteenth aspects, each uplink transmission of a group of uplink transmissions included in a time-domain window for DMRS bundling is associated with a same frequency domain resource allocation.

In a sixteenth aspect, alone or in combination with one or more of the first through fifteenth aspects, the scheduling information, or information associated with the scheduling information, indicates the set of time-domain windows.

In a seventeenth aspect, alone or in combination with one or more of the first through sixteenth aspects, the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

In an eighteenth aspect, alone or in combination with one or more of the first through seventeenth aspects, the scheduling information, or information associated with the scheduling information, indicates which uplink transmissions, of the set of uplink transmissions, are DMRS bundled with each other.

In a nineteenth aspect, alone or in combination with one or more of the first through eighteenth aspects, the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

In a twentieth aspect, alone or in combination with one or more of the first through nineteenth aspects, the scheduling information is transmitted via a single DCI and the set of uplink transmissions include a set of physical uplink shared channel transmissions.

In a twenty-first aspect, alone or in combination with one or more of the first through twentieth aspects, a gap between a first group of transmissions and a second group of transmissions, of the set of uplink transmissions, is less than a configured threshold.

In a twenty-second aspect, alone or in combination with one or more of the first through twenty-first aspects, power updates are not allowed between uplink transmissions of the set of uplink transmissions.

In a twenty-third aspect, alone or in combination with one or more of the first through twenty-second aspects, each uplink transmission, of the set of uplink transmissions, is associated with the same frequency domain resource allocation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
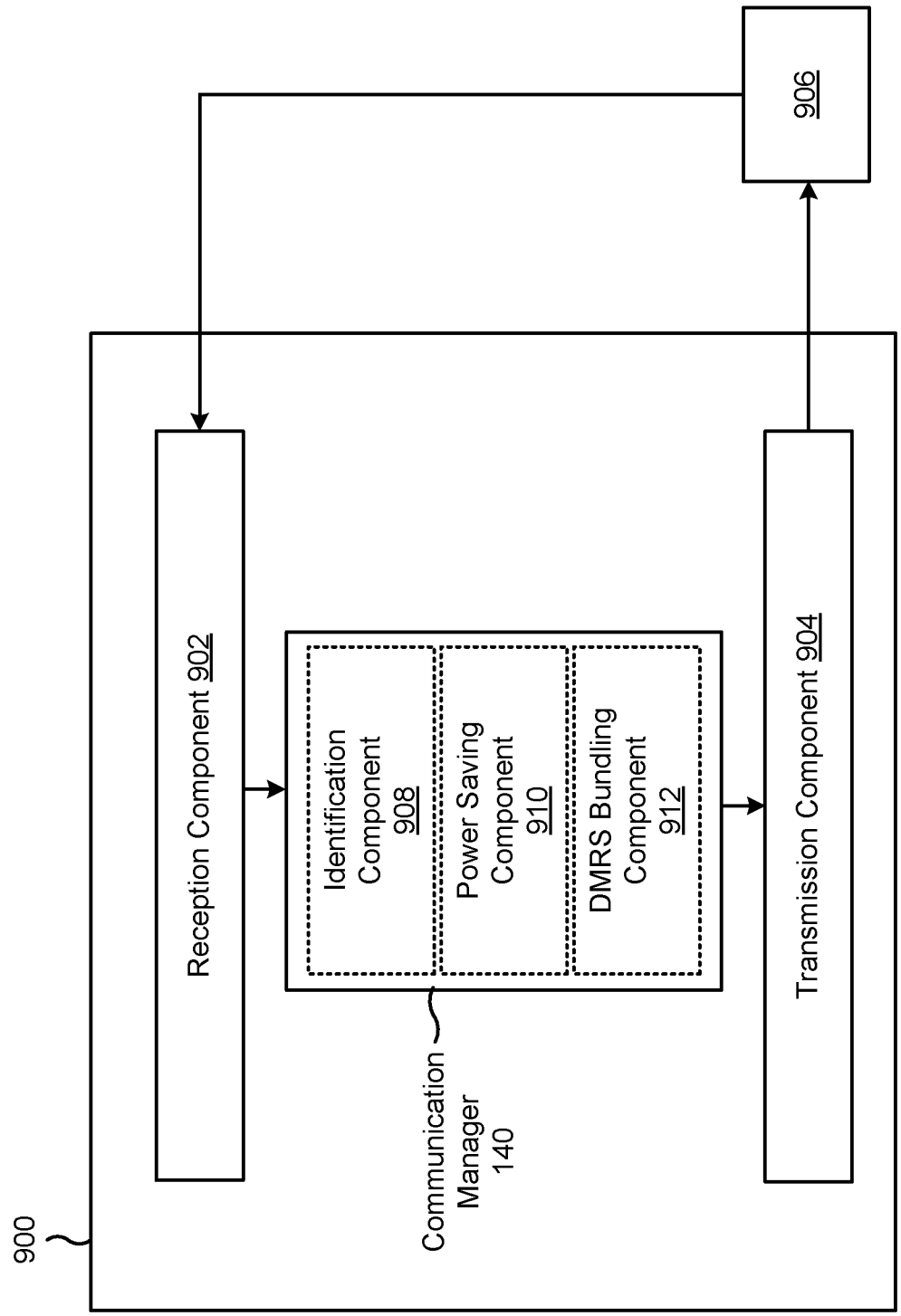
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network entity, or another wireless communication device) using the reception component 902 and the transmission component 904. As further shown, the apparatus 900 may include the communication manager 140. The communication manager 140 may include one or more of an identification component 908, a power saving component 910, or a DMRS bundling component 912, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive scheduling information for a set of uplink transmissions of the UE. The identification component 908 may identify a set of time-domain windows for DMRS bundling. The transmission component 904 may transmit the set of uplink transmissions using a DMRS bundling configuration that is based at least in part on the set of time-domain windows for DMRS bundling.

The reception component 902 may receive information identifying at least one of the offset or the start time.

The reception component 902 may receive a TPC command during a time-domain window of the set of time-domain windows, wherein the TPC command indicates a zero-value transmit power adjustment based at least in part on the TPC command being within the time-domain window.

The power saving component 910 may suspend a power saving configuration of the UE while the DMRS bundling configuration is active.

The DMRS bundling component 912 may activate or deactivate the DMRS bundling configuration based at least in part on receiving medium access control signaling or downlink control information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
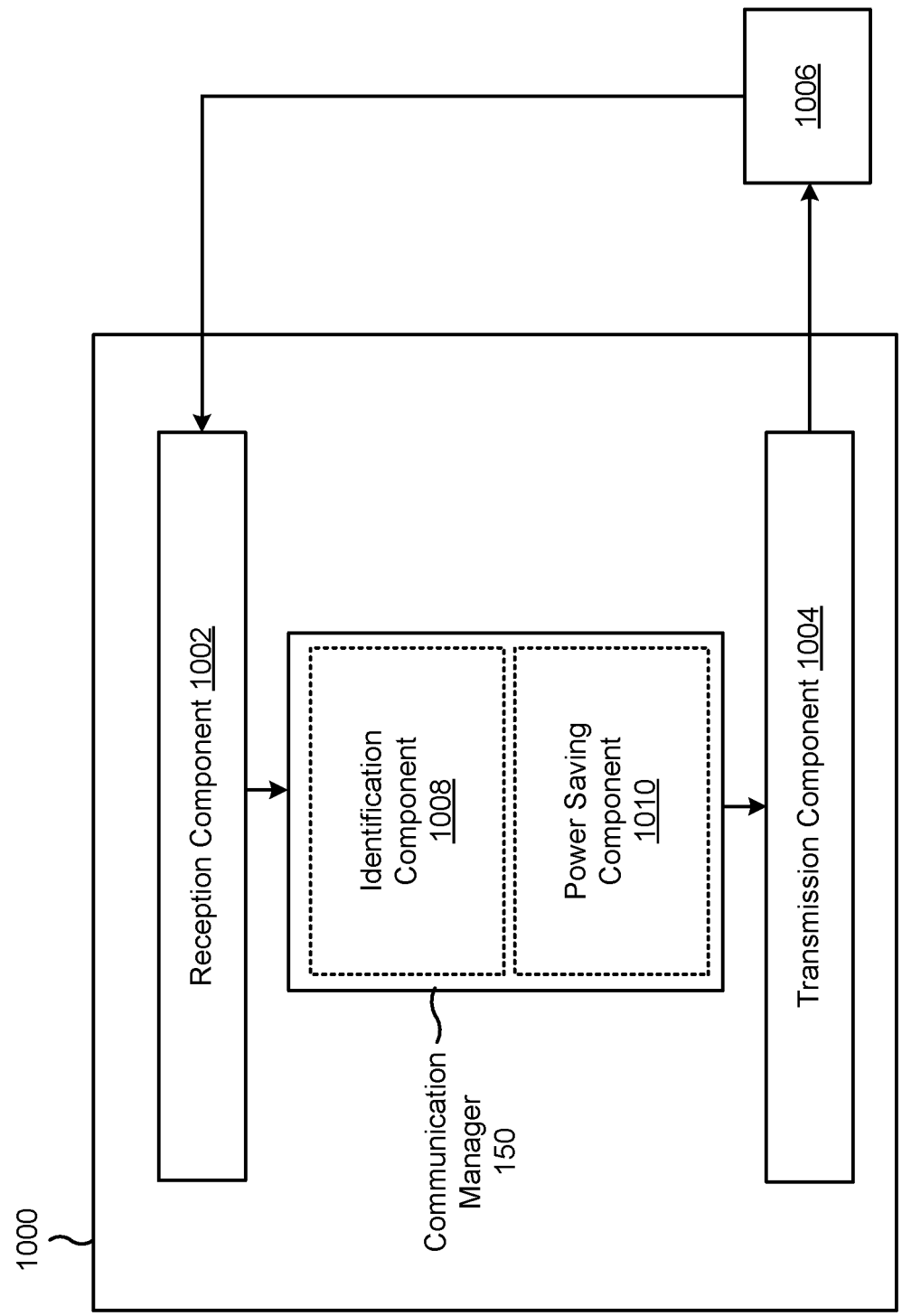

FIG. 10 is a diagram of an example apparatus 1000 for wireless communication, in accordance with the present disclosure. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, or another wireless communication device) using the reception component 1002 and the transmission component 1004. As further shown, the apparatus 1000 may include the communication manager 150. The communication manager 150 may include one or more of an identification component 1008 or a power saving component 1010, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit scheduling information for a set of uplink transmissions of a UE. The identification component 1008 may identify a set of time-domain windows for DMRS bundling of the UE. The reception component 1002 may receive the set of uplink transmissions using a DMRS bundling configuration that is based at least in part on the set of time-domain windows for DMRS bundling.

The transmission component 1004 may transmit information identifying at least one of the offset or the start time.

The transmission component 1004 may transmit a TPC command during a time-domain window of the set of time-domain windows, wherein the TPC command indicates a zero-value transmit power adjustment based at least in part on the TPC command being within the time-domain window.

The power saving component 1010 may suspend a power saving configuration of the UE while the DMRS bundling configuration is active.

The transmission component 1004 may transmit medium access control signaling or downlink control information indicating to activate or deactivate the DMRS bundling configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 11:
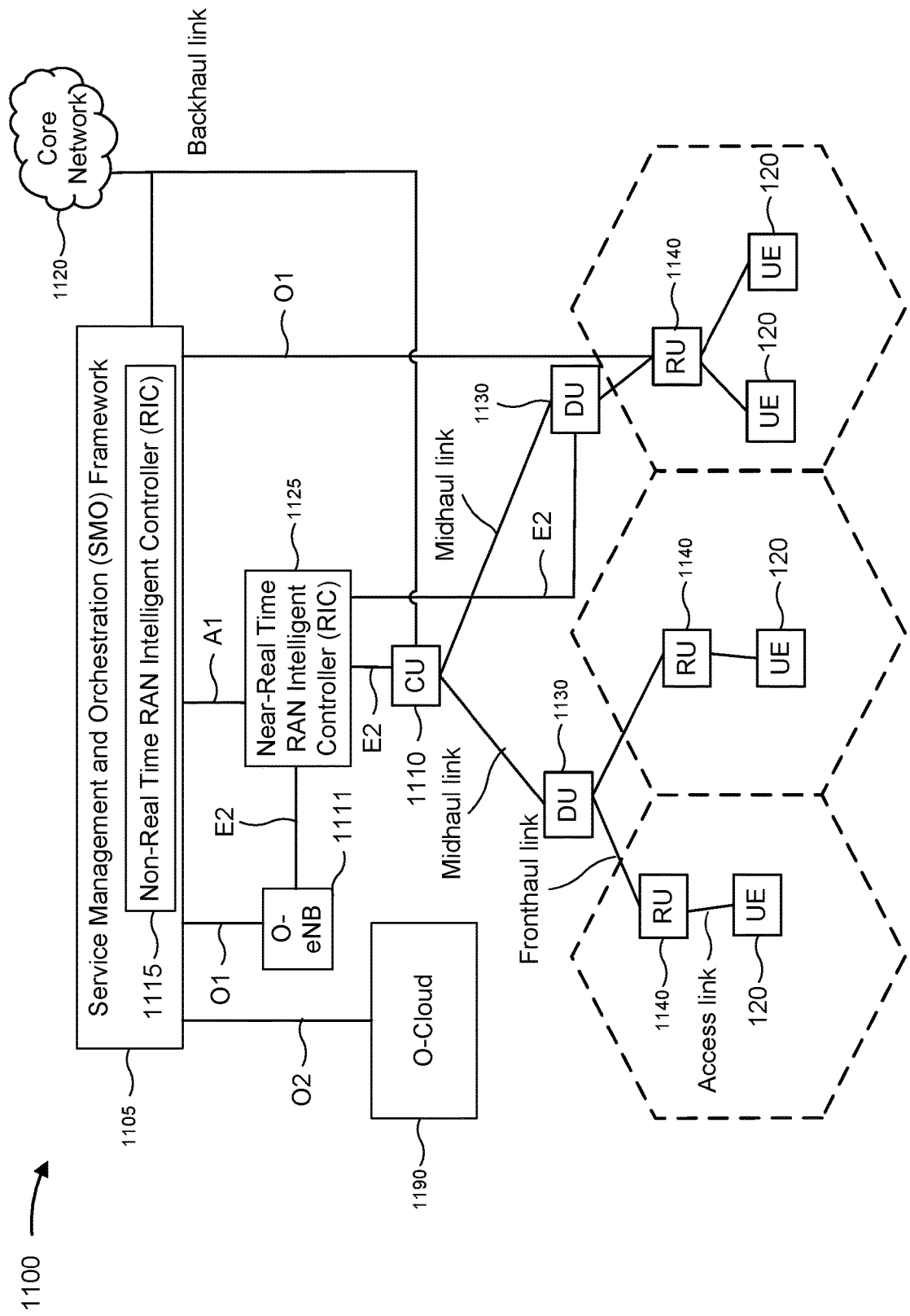
FIG. 11 is a diagram illustrating an example disaggregated base station architecture, in accordance with the present disclosure.

FIG. 11 is a diagram illustrating an example disaggregated base station architecture 1100, in accordance with the present disclosure. The disaggregated base station architecture 1100 may include a CU 1110 that can communicate directly with a core network 1120 via a backhaul link, or indirectly with the core network 1120 through one or more disaggregated control units (such as a Near-RT RIC 1125 via an E2 link, or a Non-RT RIC 1115 associated with a Service Management and Orchestration (SMO) Framework 1105, or both). A CU 1110 may communicate with one or more DUs 1130 via respective midhaul links, such as through F1 interfaces. Each of the DUs 1130 may communicate with one or more RUs 1140 via respective fronthaul links. Each of the RUs 1140 may communicate with one or more UEs 120 via respective radio frequency (RF) access links. In some implementations, a UE 120 may be simultaneously served by multiple RUs 1140.

Each of the units, including the CUs 1110, the DUs 1130, the RUs 1140, as well as the Near-RT RICs 1125, the Non-RT RICs 1115, and the SMO Framework 1105, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 1110 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 1110. The CU 1110 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1110 can be logically split into one or more CU-UP units and one or more CU-CP units. A CU-UP unit can communicate bidirectionally with a CU-CP unit via an interface, such as the E1 interface when implemented in an O-RAN configuration. The CU 1110 can be implemented to communicate with a DU 1130, as necessary, for network control and signaling.

Each DU 1130 may correspond to a logical unit that includes one or more base station functions to control the operation of one or more RUs 1140. In some aspects, the DU 1130 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1130 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1130, or with the control functions hosted by the CU 1110.

Each RU 1140 may implement lower-layer functionality. In some deployments, an RU 1140, controlled by a DU 1130, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1140 can be operated to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable each DU 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements, which may be managed via an operations and maintenance interface (such as an O1 interface). For virtualized network elements, the SMO Framework 1105 may be configured to interact with a cloud computing platform (such as an open cloud (O-Cloud) platform 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140, non-RT RICs 1115, and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with each of one or more RUs 1140 via a respective O1 interface. The SMO Framework 1105 also may include a Non-RT MC 1115 configured to support functionality of the SMO Framework 1105.

The Non-RT MC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via an O1 interface) or via creation of RAN management policies (such as A1 interface policies).

As indicated above, FIG. 11 is provided as an example. Other examples may differ from what is described with regard to FIG. 11.

The following provides an overview of some Aspects of the present disclosure:

Aspect 1: A method of wireless communication performed by an apparatus of a user equipment (UE), comprising: receiving scheduling information for a set of uplink transmissions of the UE; identifying a set of time-domain windows for demodulation reference signal (DMRS) bundling; and transmitting the set of uplink transmissions using a DMRS bundling configuration that is based at least in part on the set of time-domain windows for DMRS bundling.

Aspect 2: The method of Aspect 1, wherein the set of time-domain windows are independent of one or more times associated with the set of uplink transmissions.

Aspect 3: The method of any of Aspects 1-2, wherein identifying the set of time-domain windows further comprises: identifying the set of time-domain windows based at least in part on an offset indicating a start time for a time-domain window of the set of time-domain windows and a duration identifying a length of the time-domain window.

Aspect 4: The method of Aspect 3, further comprising: receiving information identifying at least one of the offset or the duration.

Aspect 5: The method of any of Aspects 1-4, wherein transmitting the set of uplink transmissions using the DMRS bundling configuration further comprises: transmitting, with each uplink transmission that is within a particular time-domain window of the set of time-domain windows, one or more bundled DMRSs.

Aspect 6: The method of Aspect 5, wherein the bundled DMRSs are associated with a threshold level of phase continuity across each uplink transmission within the particular time-domain window.

Aspect 7: The method of Aspect 5, wherein transmitting each uplink transmission that is within the particular time-domain window, of the set of time-domain windows, including bundled DMRSs, is based at least in part on a set of grants, for each uplink transmission that is within the particular time-domain window, arriving before a start of the particular time-domain window.

Aspect 8: The method of any of Aspects 1-7, wherein a length of a time-domain window of the set of time-domain windows is based at least in part on a modulation order of the set of uplink transmissions.

Aspect 9: The method of Aspect 8, wherein the modulation order is an expected worst-case modulation order.

Aspect 10: The method of Aspect 8, wherein the DMRS bundling configuration is used only if the modulation order is one of a set of modulation orders.

Aspect 11: The method of Aspect 10, wherein the set of modulation orders includes a quadrature phase shift keying modulation order.

Aspect 12: The method of any of Aspects 1-11, further comprising: receiving a transmit power control (TPC) command during a time-domain window of the set of time-domain windows; and one of: postponing application of the TPC command until an end of the time-domain window; or disregarding the TPC command.

Aspect 13: The method of any of Aspects 1-12, further comprising: receiving a transmit power control (TPC) command during a time-domain window of the set of time-domain windows, wherein the TPC command indicates a zero-value transmit power adjustment based at least in part on the TPC command being within the time-domain window.

Aspect 14: The method of any of Aspects 1-13, wherein transmitting the set of uplink transmissions using the DMRS bundling configuration that is based at least in part on the set of time-domain windows for DMRS bundling further comprises: transmitting a first uplink transmission of the set of uplink transmissions using a first transmit power; and transmitting a second uplink transmission of the set of uplink transmissions using a second transmit power, wherein the first uplink transmission and the second uplink transmission are within a same time-domain window, and wherein the first uplink transmission and the second uplink transmission do not use DMRS bundling, based at least in part on the first uplink transmission and the second uplink transmission having different transmit powers.

Aspect 15: The method of any of Aspects 1-14, wherein transmitting the set of uplink transmissions using the DMRS bundling configuration that is based at least in part on the set of time-domain windows for DMRS bundling further comprises: transmitting a first uplink transmission of the set of uplink transmissions using a first transmit power; and transmitting a second uplink transmission of the set of uplink transmissions using the first transmit power, wherein scheduling information for the second uplink transmission indicates a different transmit power than the first transmit power, and wherein the scheduling information for the second uplink transmission is overridden based at least in part on the first uplink transmission and the second uplink transmission being within a same time-domain window.

Aspect 16: The method of any of Aspects 1-15, further comprising: suspending a power saving configuration of the UE while the DMRS bundling configuration is active.

Aspect 17: The method of any of Aspects 1-16, further comprising: activating or deactivating the DMRS bundling configuration based at least in part on receiving medium access control signaling or downlink control information.

Aspect 18: The method of any of Aspects 1-17, further comprising: suspending inter-slot frequency hopping while the DMRS bundling configuration is active.

Aspect 19: The method of any of Aspects 1-18, wherein each uplink transmission of a group of uplink transmissions included in a time-domain window for DMRS bundling is associated with a same frequency domain resource allocation.

Aspect 20: The method of any of Aspects 1-19, wherein the scheduling information, or information associated with the scheduling information, indicates the set of time-domain windows.

Aspect 21: The method of Aspect 20, wherein the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

Aspect 22: The method of any of Aspects 1-21, wherein the scheduling information, or information associated with the scheduling information, indicates which uplink transmissions, of the set of uplink transmissions, are DMRS bundled with each other.

Aspect 23: The method of any of Aspects 1-22, wherein the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

Aspect 24: The method of any of Aspects 1-23, wherein the scheduling information is received via a single downlink control information (DCI) and the set of uplink transmissions include a set of physical uplink shared channel transmissions.

Aspect 25: The method of Aspect 24, wherein a gap between a first group of transmissions and a second group of transmissions, of the set of uplink transmissions, is less than a configured threshold.

Aspect 26: The method of Aspect 24, wherein power updates are not allowed between uplink transmissions of the set of uplink transmissions.

Aspect 27: The method of Aspect 24, wherein each uplink transmission, of the set of uplink transmissions, is associated with the same frequency domain resource allocation.

Aspect 28: A method of wireless communication performed by a network entity, comprising: transmitting scheduling information for a set of uplink transmissions of a user equipment (UE); identifying a set of time-domain windows for demodulation reference signal (DMRS) bundling of the UE; and receiving the set of uplink transmissions using a DMRS bundling configuration that is based at least in part on the set of time-domain windows for DMRS bundling.

Aspect 29: The method of Aspect 28, wherein the set of time-domain windows are independent of one or more times associated with the set of uplink transmissions.

Aspect 30: The method of any of Aspects 28-29, wherein identifying the set of time-domain windows further comprises: identifying the set of time-domain windows based at least in part on an offset indicating a start time for a time-domain window of the set of time-domain windows and a duration identifying a length of the time-domain window.

Aspect 31: The method of Aspect 30, further comprising: transmitting information identifying at least one of the offset or the duration.

Aspect 32: The method of any of Aspects 28-31, wherein receiving the set of uplink transmissions using the DMRS bundling configuration further comprises: receiving, with each uplink transmission that is within a particular time-domain window of the set of time-domain windows, one or more bundled DMRSs.

Aspect 33: The method of Aspect 32, wherein the bundled DMRSs are associated with a threshold level of phase continuity across each uplink transmission within the time-domain window.

Aspect 34: The method of Aspect 32, wherein receiving each uplink transmission that is within the particular time-domain window, of the set of time-domain windows, including bundled DMRSs, is based at least in part on a set of grants, for each uplink transmission that is within the particular time-domain window, arriving before a start of the particular time-domain window.

Aspect 35: The method of any of Aspects 28-34, wherein a length of a time-domain window of the set of time-domain windows is based at least in part on a modulation order of the set of uplink transmissions.

Aspect 36: The method of Aspect 35, wherein the modulation order is an expected worst-case modulation order.

Aspect 37: The method of Aspect 35, wherein the DMRS bundling configuration is used only if the modulation order is one of a set of modulation orders.

Aspect 38: The method of Aspect 37, wherein the set of modulation orders includes a quadrature phase shift keying modulation order.

Aspect 39: The method of any of Aspects 28-38, further comprising: transmitting a transmit power control (TPC) command during a time-domain window of the set of time-domain windows, wherein the TPC command indicates a zero-value transmit power adjustment based at least in part on the TPC command being within the time-domain window.

Aspect 40: The method of any of Aspects 28-39, further comprising: suspending a power saving configuration of the UE while the DMRS bundling configuration is active.

Aspect 41: The method of any of Aspects 28-40, further comprising: transmitting medium access control signaling or downlink control information indicating to activate or deactivate the DMRS bundling configuration.

Aspect 42: The method of any of Aspects 28-41, further comprising: suspending inter-slot frequency hopping while the DMRS bundling configuration is active.

Aspect 43: The method of any of Aspects 28-42, wherein each uplink transmission of a group of uplink transmissions included in a time-domain window for DMRS bundling is associated with a same frequency domain resource allocation.

Aspect 44: The method of any of Aspects 28-43, wherein the scheduling information, or information associated with the scheduling information, indicates the set of time-domain windows.

Aspect 45: The method of Aspect 44, wherein the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

Aspect 46: The method of any of Aspects 28-45, wherein the scheduling information, or information associated with the scheduling information, indicates which uplink transmissions, of the set of uplink transmissions, are DMRS bundled with each other.

Aspect 47: The method of any of Aspects 28-46, wherein the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

Aspect 48: The method of any of Aspects 28-47, wherein the scheduling information is transmitted via a single downlink control information (DCI) and the set of uplink transmissions include a set of physical uplink shared channel transmissions.

Aspect 49: The method of Aspect 48, wherein a gap between a first group of transmissions and a second group of transmissions, of the set of uplink transmissions, is less than a configured threshold.

Aspect 50: The method of Aspect 48, wherein power updates are not allowed between uplink transmissions of the set of uplink transmissions.

Aspect 51: The method of Aspect 48, wherein each uplink transmission, of the set of uplink transmissions, is associated with the same frequency domain resource allocation.

Aspect 52: An apparatus for wireless communication at a device, comprising a processor; memory coupled with the processor; and instructions stored in the memory and executable by the processor to cause the apparatus to perform the method of one or more of Aspects 1-51.

Aspect 53: A device for wireless communication, comprising a memory and one or more processors coupled to the memory, the one or more processors configured to perform the method of one or more of Aspects 1-51.

Aspect 54: An apparatus for wireless communication, comprising at least one means for performing the method of one or more of Aspects 1-51.

Aspect 55: A non-transitory computer-readable medium storing code for wireless communication, the code comprising instructions executable by a processor to perform the method of one or more of Aspects 1-51.

Aspect 56: A non-transitory computer-readable medium storing a set of instructions for wireless communication, the set of instructions comprising one or more instructions that, when executed by one or more processors of a device, cause the device to perform the method of one or more of Aspects 1-51.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more memories storing instructions configurable to be executed by the one or more processors to cause the UE to:
receive scheduling information for a set of uplink transmissions of the UE, wherein the set of uplink transmissions includes at least two transport blocks;
identify a set of time-domain windows for demodulation reference signal (DMRS) bundling; and
transmit the set of uplink transmissions using a DMRS bundling configuration that is based at least in part on the set of time-domain windows for DMRS bundling.

2. The UE of claim 1, wherein the scheduling information, or information associated with the scheduling information, indicates the set of time-domain windows.

3. The UE of claim 2, wherein the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

4. The UE of claim 1, wherein the scheduling information, or information associated with the scheduling information, indicates which uplink transmissions, of the set of uplink transmissions, are DMRS bundled with each other.

5. The UE of claim 1, wherein the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

6. The UE of claim 1, wherein the set of time-domain windows are independent of one or more times associated with the set of uplink transmissions.

7. The UE of claim 1, wherein the instructions causing the UE to identify the set of time-domain windows, are further executable by the one or more processors to cause the UE to:
identify the set of time-domain windows based at least in part on an offset indicating a start time for a time-domain window of the set of time-domain windows and a duration identifying a length of the time-domain window.

8. The UE of claim 7, wherein the instructions configurable to be executed are further executable by the one or more processors to cause the UE to:
receive information identifying at least one of the offset or the duration.

9. The UE of claim 1, wherein the instructions configurable to be executed, when causing the UE to transmit the set of uplink transmissions using the DMRS bundling configuration, are further executable by the one or more processors to cause the UE to:
transmit, with each uplink transmission that is within a particular time-domain window of the set of time-domain windows, one or more bundled DMRSs.

10. The UE of claim 9, wherein the instructions configurable to be executed, when causing the UE to transmit each uplink transmission that is within the particular time-domain window of the set of time-domain windows, are further executable by the one or more processors to cause the UE to bundle DMRSs, based at least in part on a set of grants, for each uplink transmission that is within the particular time-domain window, arriving before a start of the particular time-domain window.

11. The UE of claim 1, wherein a length of a time-domain window of the set of time-domain windows is based at least in part on an expected worst-case modulation order of the set of uplink transmissions, wherein the DMRS bundling configuration is used only if the expected worst-case modulation order is one of a set of modulation orders including a quadrature phase shift keying modulation order.

12. The UE of claim 1, wherein the instructions configurable to be executed are further executable by the one or more processors to cause the UE to:
receive a transmit power control (TPC) command during a time-domain window of the set of time-domain windows; and
one of:
postpone application of the TPC command until an end of the time-domain window; or
disregard the TPC command.

13. The UE of claim 1, wherein the instructions configurable to be executed are further executable by the one or more processors to cause the UE to:
receive a transmit power control (TPC) command during a time-domain window of the set of time-domain windows, wherein the TPC command indicates a zero-value transmit power adjustment based at least in part on the TPC command being within the time-domain window.

14. The UE of claim 1, wherein the instructions configurable to be executed are further executable by the one or more processors to cause the UE to:
suspend inter-slot frequency hopping while the DMRS bundling configuration is active.

15. The UE of claim 1, wherein each uplink transmission of a group of uplink transmissions included in a time-domain window for DMRS bundling is associated with a same frequency domain resource allocation.

16. The UE of claim 1, wherein the scheduling information is received via a single downlink control information (DCI) and the set of uplink transmissions include a set of physical uplink shared channel transmissions.

17. The UE of claim 16, wherein a gap between a first group of transmissions and a second group of transmissions, of the set of uplink transmissions, is less than a configured threshold.

18. The UE of claim 16, wherein power updates are not allowed between uplink transmissions of the set of uplink transmissions.

19. The UE of claim 16, wherein each uplink transmission, of the set of uplink transmissions, is associated with a same frequency domain resource allocation.

20. A network entity for wireless communication, comprising:
one or more memories; and
one or more processors coupled to the one or more memories, the one or more memories storing instructions configurable to be executed by the one or more processors to cause the network entity to:

transmit scheduling information for a set of uplink transmissions of a user equipment (UE), wherein the set of uplink transmissions includes at least two transport blocks;

identify a set of time-domain windows for demodulation reference signal (DMRS) bundling of the UE; and receive the set of uplink transmissions using a DMRS bundling configuration that is based at least in part on the set of time-domain windows for DMRS bundling.

21. The network entity of claim 20, wherein the scheduling information, or information associated with the scheduling information, indicates the set of time-domain windows.

22. The network entity of claim 21, wherein the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

23. The network entity of claim 20, wherein the scheduling information, or information associated with the scheduling information, indicates which uplink transmissions, of the set of uplink transmissions, are DMRS bundled with each other.

24. The network entity of claim 20, wherein the scheduling information is conveyed via a set of grants associated with the set of uplink transmissions, and wherein each grant associated with a group of uplink transmissions that are DMRS bundled with each other arrives prior to a start of a time-domain window that includes the group of uplink transmissions.

25. A method of wireless communication performed by an apparatus of a user equipment (UE), comprising:

receiving scheduling information for a set of uplink transmissions of the UE, wherein the set of uplink transmissions includes at least two transport blocks;

identifying a set of time-domain windows for demodulation reference signal (DMRS) bundling; and transmitting the set of uplink transmissions using a DMRS bundling configuration that is based at least in part on the set of time-domain windows for DMRS bundling.

26. The method of claim 25, wherein the scheduling information, or information associated with the scheduling information, indicates the set of time-domain windows.

27. The method of claim 26, wherein the scheduling information indicates a number of uplink transmissions or a number of corresponding grants to be DMRS bundled, and wherein a time-domain window corresponding to a group of uplink transmissions to be DMRS bundled starts at a first uplink transmission of the group of uplink transmissions.

28. The method of claim 25, wherein the scheduling information, or information associated with the scheduling information, indicates which uplink transmissions, of the set of uplink transmissions, are DMRS bundled with each other.

29. A method of wireless communication performed by a network entity, comprising:

transmitting scheduling information for a set of uplink transmissions of a user equipment (UE), wherein the set of uplink transmissions includes at least two transport blocks;

identifying a set of time-domain windows for demodulation reference signal (DMRS) bundling of the UE; and receiving the set of uplink transmissions using a DMRS bundling configuration that is based at least in part on the set of time-domain windows for DMRS bundling.

30. The method of claim 29, wherein the scheduling information, or information associated with the scheduling information, indicates the set of time-domain windows.

* * * * *